INVENTORS
JOHN J. BRETT
ALBERT HOHMANN
BY Fay, Sharpe & Mulholland
ATTORNEYS

INVENTORS
JOHN J. BRETT
ALBERT HOHMANN
BY Fay, Sharpe & Mulholland
ATTORNEYS

Sept. 17, 1968 J. J. BRETT ET AL 3,401,877
DATA PUNCH
Filed April 13, 1966 18 Sheets-Sheet 3

INVENTORS
JOHN J. BRETT
ALBERT HOHMANN
BY
Fay, Sharpe & Mulholland
ATTORNEYS

Sept. 17, 1968 J. J. BRETT ET AL 3,401,877

DATA PUNCH

Filed April 13, 1966 18 Sheets-Sheet 4

INVENTORS
JOHN J. BRETT
ALBERT HOHMANN
BY
Gray, Sharpe & Mulholland
ATTORNEYS

INVENTORS
JOHN J. BRETT
ALBERT HOHMANN
BY
Fay, Sharpe & Mulholland
ATTORNEYS

INVENTORS
JOHN J. BRETT
ALBERT HOHMANN
BY
Gray, Sharpe & Mulholland
ATTORNEYS

INVENTORS
JOHN J. BRETT
ALBERT HOHMANN
BY
Fay, Sharpe & Mulholland
ATTORNEYS

INVENTORS
JOHN J. BRETT
ALBERT HOHMANN
BY
Fay, Sharpe & Mulholland
ATTORNEYS

Sept. 17, 1968 J. J. BRETT ETAL 3,401,877

DATA PUNCH

Filed April 13, 1966 18 Sheets-Sheet 9

INVENTORS
JOHN J. BRETT
ALBERT HOHMANN

BY
Gray, Sharpe & Mulholland
ATTORNEYS

INVENTORS
JOHN J. BRETT
ALBERT HOHMANN
BY
Fay, Sharpe & Mulholland
ATTORNEYS

INVENTORS.
JOHN J. BRETT &
ALBERT HOHMANN
BY
*Fay, Sharpe & Mulholland*
ATTORNEYS

DATA PUNCH

Filed April 13, 1966

18 Sheets-Sheet 12

INVENTORS.
JOHN J. BRETT &
ALBERT HOHMANN
BY
*Fay, Sharpe & Mulholland*
ATTORNEYS INVENTORS.
JOHN J. BRETT &
ALBERT HOHMANN
BY
Fay, Sharpe & Mulholland
ATTORNEYS INVENTORS.
JOHN J. BRETT &
ALBERT HOHMANN
BY
Fay, Sharpe & Mulholland
ATTORNEYS INVENTORS.
JOHN J. BRETT &
ALBERT HOHMANN
BY
*Fay, Sharpe & Mulholland*
ATTORNEYS INVENTORS.
JOHN J. BRETT &
ALBERT HOHMANN
BY
Fay, Sharpe & Mulholland
ATTORNEYS INVENTORS.
JOHN J. BRETT &
ALBERT HOHMANN
BY
Fay, Sharpe & Mulholland
ATTORNEYS

DATA PUNCH

Filed April 13, 1966

INVENTORS.
JOHN J. BRETT &
ALBERT HOHMANN
BY
Fay, Sharpe & Mulholland
ATTORNEYS 3,401,877
DATA PUNCH John J. Brett, Cleveland, Ohio, and Albert Hohmann, Brooklyn, N.Y.; said Brett assignor to Universal Time Punch, Inc., Cleveland, Ohio, a corporation of Ohio, and said Hohmann assignor to Taller & Cooper, Inc., Brooklyn, N.Y., a corporation of New York Filed Apr. 13, 1966, Ser. No. 542,299
28 Claims. (Cl. 234—2)

ABSTRACT OF THE DISCLOSURE

A data recording unit having a die block and punches slidably mounted in a stripper perpendicular to the plane of the die but spaced therefrom in order to form a slot in which a punch card may be inserted. A solenoid through appropriate connections causes the die block and punches to impulsively converge upon an appropriate signal. Some of the punches are prohibited from any substantial movement during the convergence of the die and the punches. These relatively stationary punches punch the card. The punches are selectively prohibited from movement by an interposer on a data input module according to information supplied to the module.

The data input module may be combined with a timed rotary cam system in order to make the data input system a time punch. Alternately, the die and punch module may be connected with a means for storing information from a manual input and a master card. Appropriate actuating means detect the information on the master card and the manual input system and transmit it to the punch card.

This invention relates to a data punch system. More specifically, this invention relates to a system which will program a common punch card which from either a master card or from information put into a machine and make use of this same card to record time in machine langauge.

The problem in this area is outlined in the June 1964 issue of "Computers and Data Processing." It therein states: "Electronic data processing developed from a need to handle information in a hurry!" Yet paradoxically, 90% of the planned information fed into computers for processing and analysis is still converted into machine language from hand-written documents. This means that information gathered in the plant is handled twice, once when it is manually recorded, again when it is converted to machine language.

It is quite understandable, therefore, that much interest has been devoted to mechanising source data gathering so that repetitive data is entered into a common language medium at birth. Once the data is established, its "native tongue" becomes that of the machine.

Advantages of recorded data in machine language include insured accuracy of transmission (no transcription errors); continuous availability of data for reuse in further analysis; elimination of labor time for manual entry of data; and speedier access to source data. In addition, the volume of information recorded has little bearing on the time required to enter it; peak periods are handled with the same dispatch as average periods.

The desirability of entering source data just once, in continuously usable form and at low cost, is accepted by both the large plant operation and the small manufacturing concern. And with the availability of data processing service bureaus, the latter have become increasingly aware of the advantages to be gained by extending machine procedures right back to the point of feed. However, source data gathering directly in machine language is often seen by the management of small and medium sized companies as either too complex or too expensive. A heavy percentage of firms still engage in "manual procedures at the plant level."

The article in "Computers and Data Processing" then goes on to point out that various sophisticated and extremely expensive units are available for data collection communication and transmission.

The article thereafter states: "However, for the small and medium-sized company—or the company which for some reason which cannot make a commitment to a wire or cable installation—a system which provides low-cost machine-language information without the emphasis on speed or immediate availability may be more feasible."

In the past, most of the modular or non-wired systems depended heavily on pre-punching, as the information required for batch processing application is usually known in advance. In most cases, this provided the bulk of the data for the source document.

However, pre-punching did not provide the variable information needed to complete a source document. Time, for example, had to be printed on the card with the time recorder. This "in" and "out" information was then mentally computed by a clerk or a time keeper to arrive at elapsed time, which was first manually entered, then subsequently key-punched and verified. Only then could the source information be considered acceptable input for data processing.

Other variable information, such as machine number, man number, or number of pieces produced also had to be hand-written, key-punched, and verified before becoming usable. The basic problem of the input bottleneck here became one of providing a means of directly entering variable input information into the tabulating card at the source without the investment in the total wire or cable system.

To aid in the solution of this problem, a number of modular units have been developed, among them that of Universal Time Punch with which job-cost data and one hundreths of an hour can be recorded on 80-column tab cards.

This unit requires no wiring or installation. It can be plugged into any electrical outlet and will prepare data for automatic processing as a by-product of regular start and stop time recording. The elapsed time for the job can be calculated automatically on conventional tab equipment or computer.

The cards used in the time punch can also be automatically programmed in machine language by use of the card read variable data unit.

While it is true that punching a standard computer punch card with the time in machine language greatly facilitates the collection and processing of data, it is also true that the pre-punching done on these cards was both painstaking and time consuming. That is, the usual punch card had to be prepunched with the coded identification of the person, project or whatever.

The present invention also solves this problem of prepunching the data cards for proper identification by using the same basic punching mechanism from the time punch in a mechanism for selectively punching certain parts of the card by means of information which may either come from a master card or from independent programming from levers.

With this present invention a standard computer card, credit card or the like having only pilot holes punched in it and otherwise not having any other information or holes in the card may be used. It may be fed into a card read-variable data punch in which it can be programmed to identify a person, job or any other information which is desirable. This card may be then used in the time punch to record the time spent on any given project. That is, the time of both starting and stopping may be recorded on the same card.

The machines of this system are comprised of modular units. One modular unit includes a die, a stripper parallel to and spaced apart from the die block so that a punch card may be inserted in the slot formed therebetween. A stop is provided at the end of the slot in order to provide a definite positioning of a common data card that is placed in the slot. Punches are loosely mounted in the stripper in order that they may reciprocate or slide in a direction perpendicular to the plane of the die. An electromagnet is used for impulsively moving the die to the punches and the stripper. The punches will generally move upward with the die if they are not prohibited from doing so by some type of stop or interposer which is positioned above their upper end. When a stop is placed above a given punch, it is held down so that when the die moves upward, it pushes the card into the punch thereby punching a hole in the card.

The second and third modules are to be used individually with the first module in order to determine which punches will be held in a down position as the die moves upward.

The second module consists of a structure which is designed to either accept a master card, read it, and punch the blank card with the identical information, or accept original information supplied by the operator, for example, by the positioning of levers.

The heart of the second module is an element known and hereinafter referred to as an "interposer." The interposer is generally an oval-shaped strip. The interposer has means for detecting information in a master card. The interposer further has means for accepting information directly from the operator and means for relating this information to the punch components.

This third module, which would be used instead of the second module, comprises rotary timed shafts having stops and interposers of a different shape connected thereto. The use of the third module with the first makes a time punch.

It is also anticipated with the present data system to use pilot pins which will sense pilot holes in the data cards in order to determine if the cards have been correctly positioned in the machines. It is further anticipated that two punch positions may be provided for each end of the card. That is, two sets of pilot holes may be provided at each end of the card. The two sets of pilot holes would be utilized by providing an abutment which will move in front of the normal stopping position. That is, when the abutment is not in front of the normal stopping position, one set of pilot holes will be utilized and when the abutment is moved in front of the ordinary stopping position, then the other set of pilot holes will be utilized. By simply flipping the card end over end, the other sets of pilot holes may be utilized.

Specifically, the present invention contemplates a data recording unit which comprises a die and a stripper parallel to and spaced apart from the die so that the punch card may be inserted in the slot formed therebetween. A stop is provided at the end of the slot in order to establish a definite position of a common data card that is placed in the slot. Punches are mounted in the stripper in order that they may slide in a direction perpendicular to the plane of the die. A solenoid is used for impulsively moving the die to the punches and the stripper. The punches will generally move upward with the die if they are not prohibited from doing so by some type of a stop or interposer which is positioned above them. If such a stop is above a given punch, then it will be held down to punch a card which is between the die and the stripper.

Means for selectively positioning the stops above the punches are also provided in order that different data may be recorded at will on the cards. The means for maintaining the punches in a down position while the die moves upward may either be timed rotary cams and thus make the machine a time punch or it may be a card read-variable data unit which is designed to accept a master card, read it and punch a blank with the identical information, or punch a blank with original information supplied to the machine.

By providing the abutment to offset the card one column and two sets of pilot pin holes a punch card is able to retain exactly twice as much data as a normal card would with only one set of pilot pins.

Figure 6:
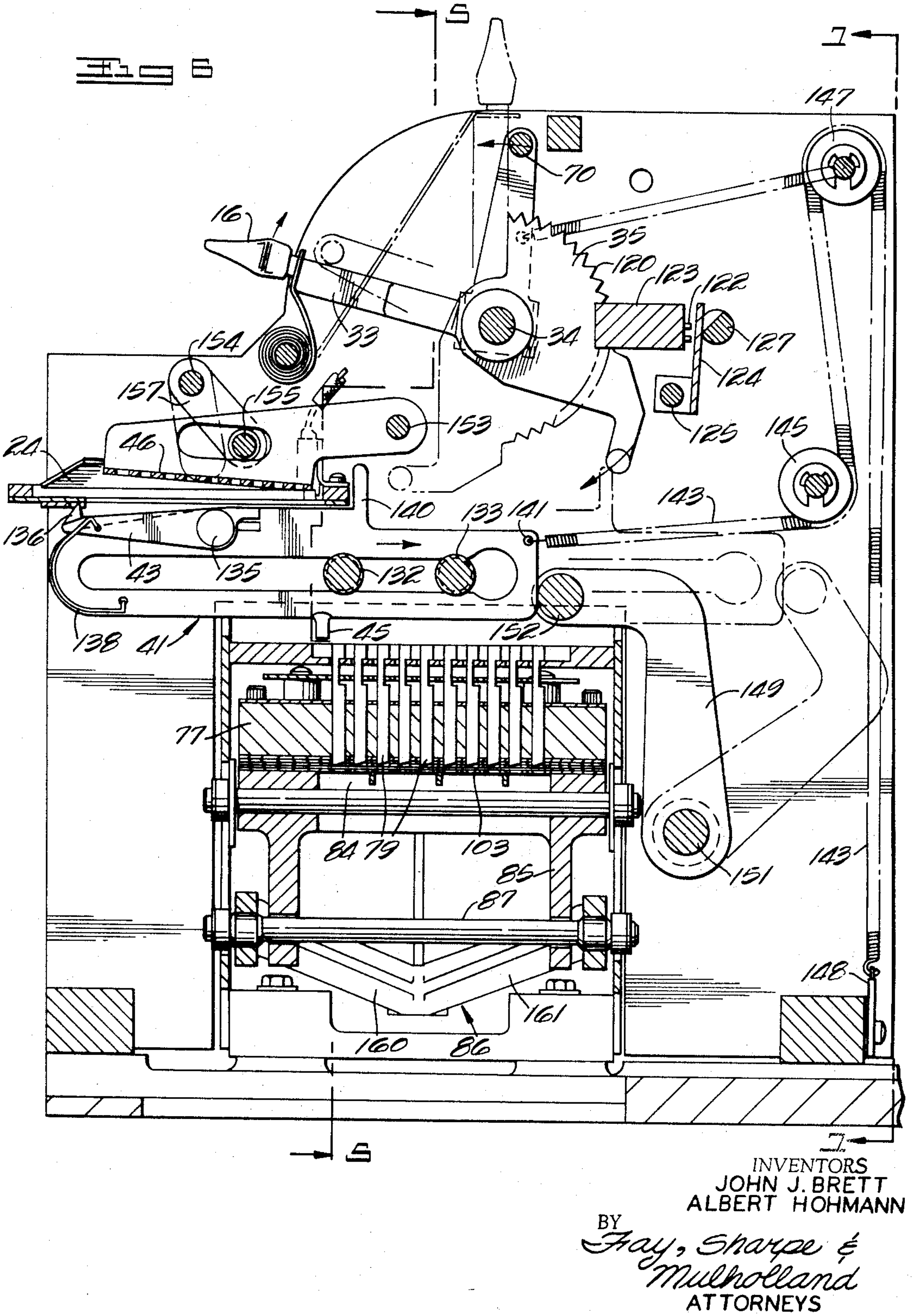
FIG. 6 is a sectional taken through lines 6—6 of FIG. 5 and is a partially cut away view from the side.
Figure 7:
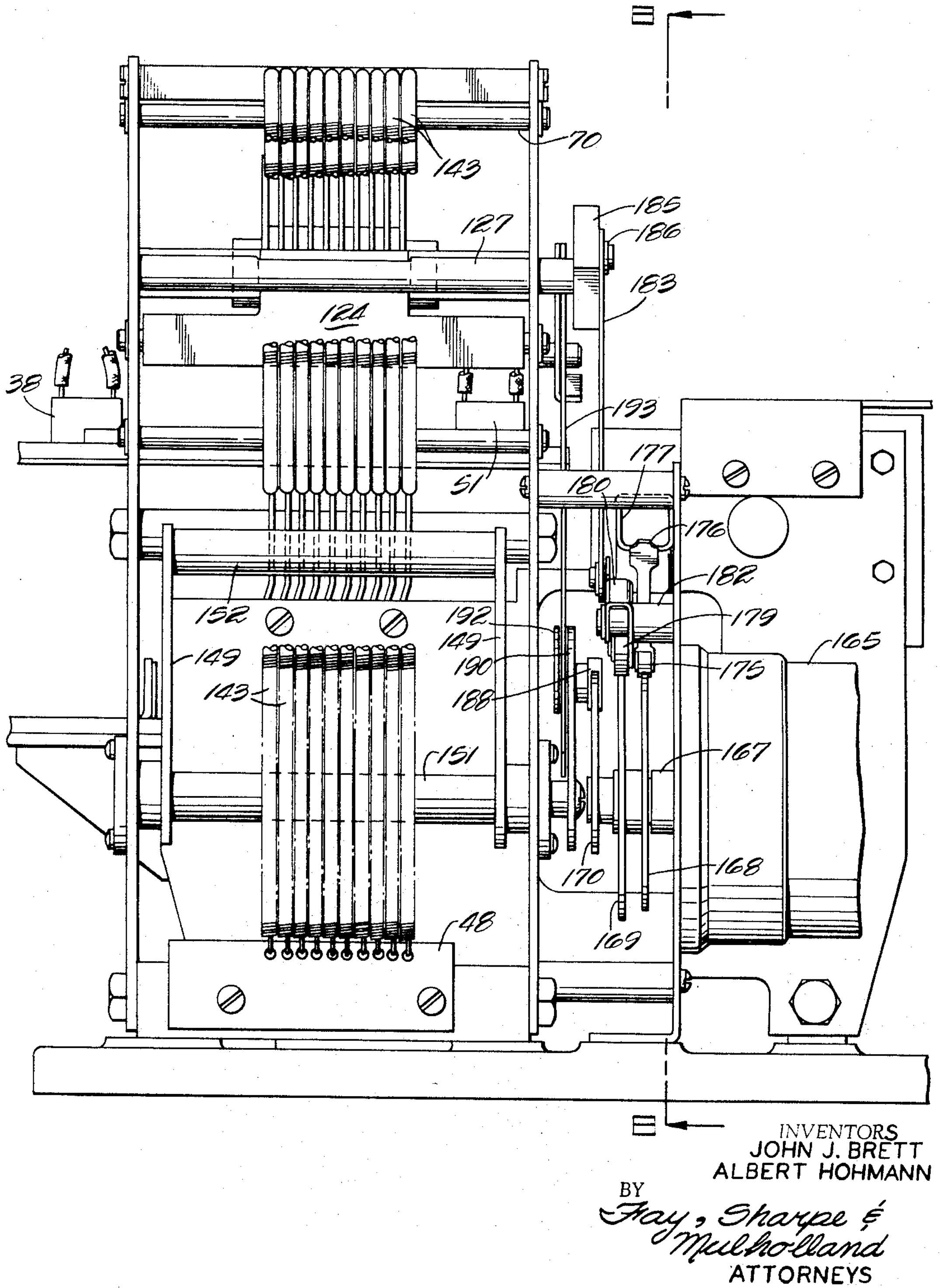

FIG. 7 taken along the lines 7—7 of FIG. 6 shows the rear of the machine.

Figure 8:
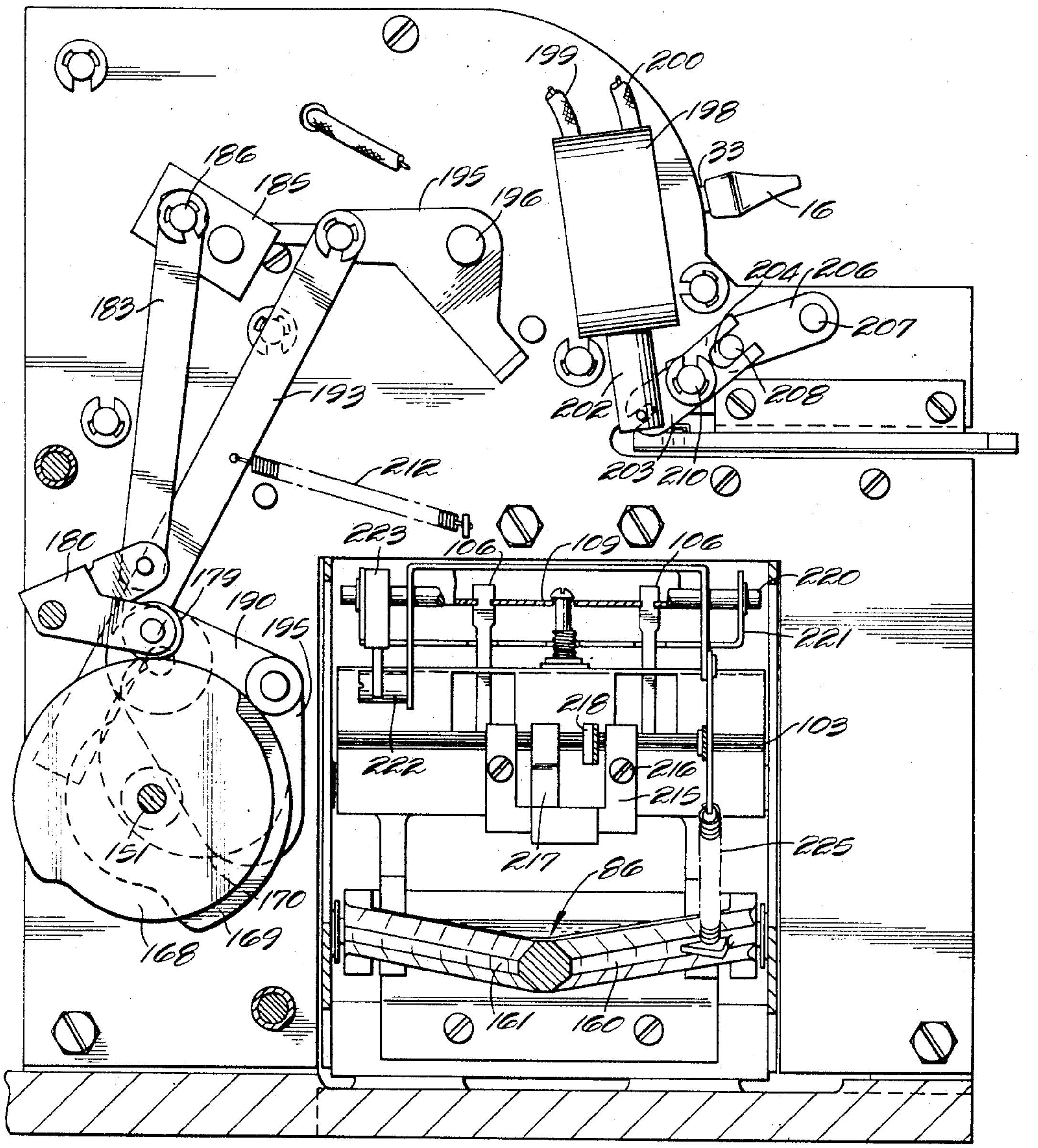

FIG. 8 is taken along the sectional 8—8 of FIG. 7 indicating a cut away of the left side.

Figure 9:
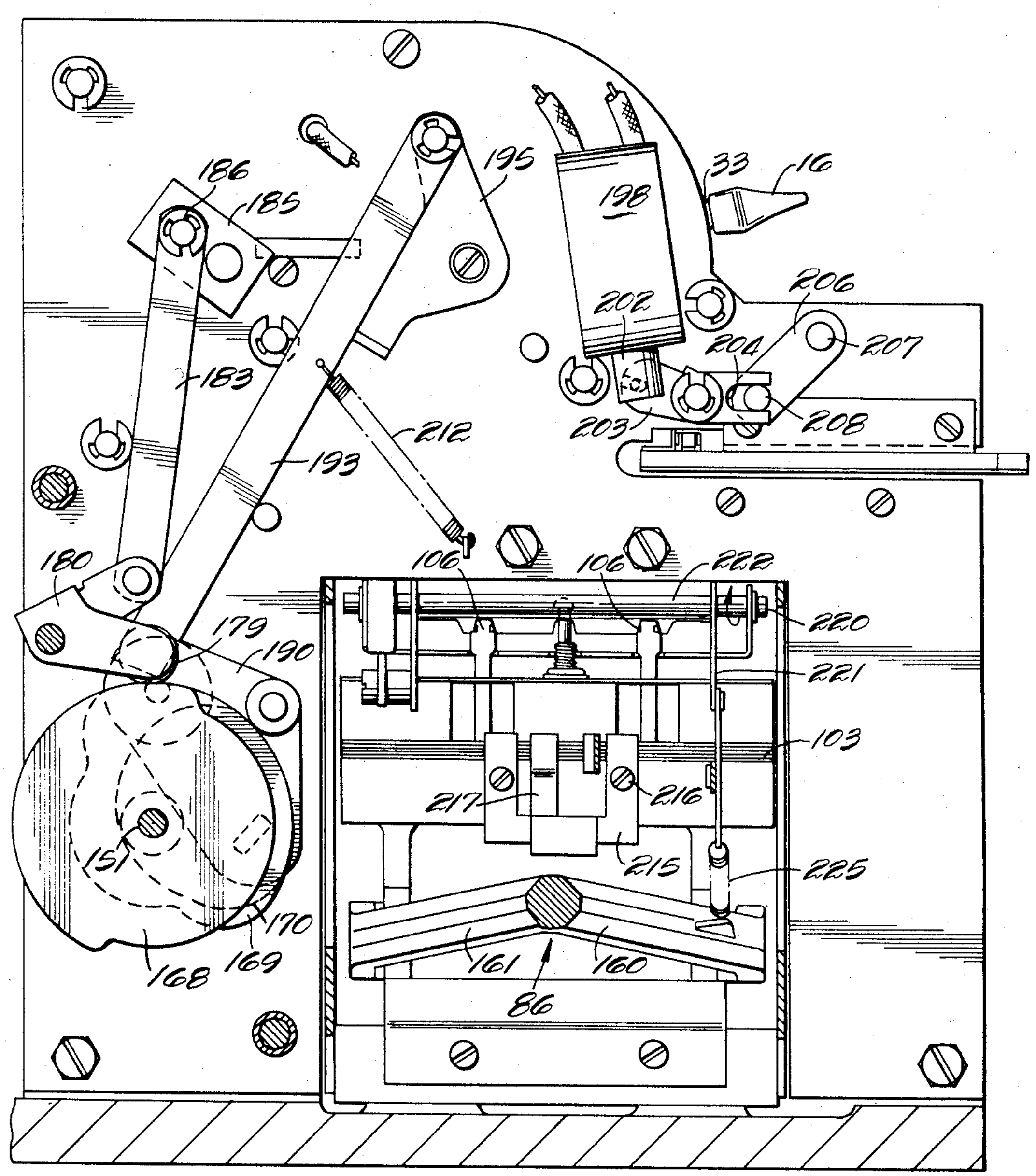

FIG. 9 is also a cut away of the left side showing a different position of the motor as it turns.

Figure 10:
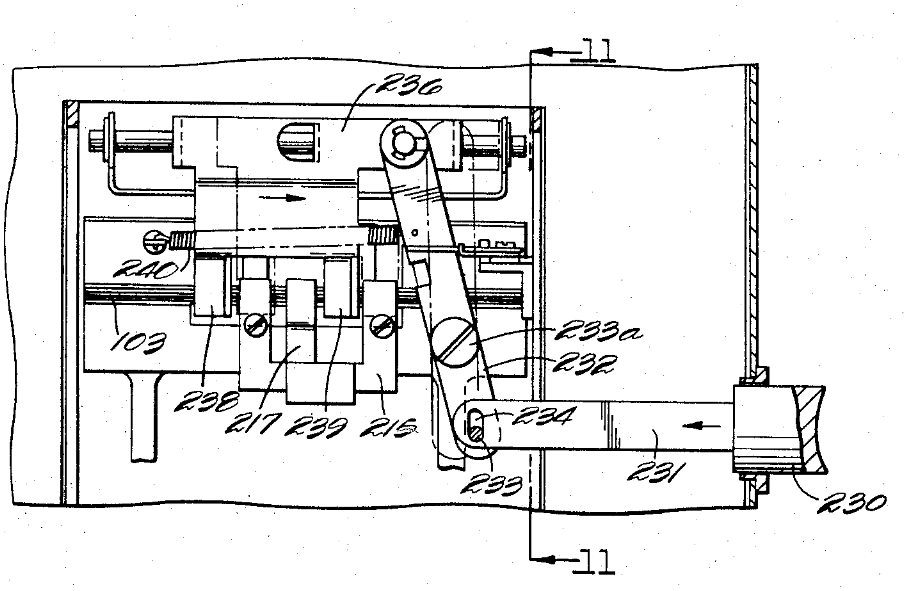
Figure 11:
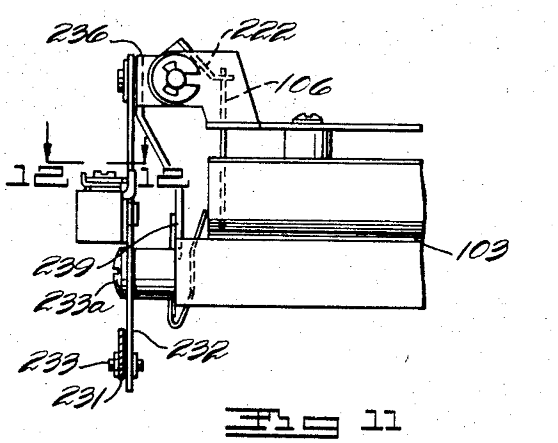
Figure 12:
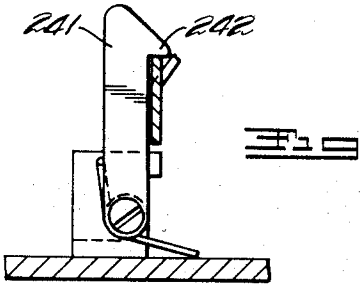

FIGS. 10, 11 and 12 indicate the mechanism for putting an abutment in front of the normal stopping position of the card.

Figure 13:
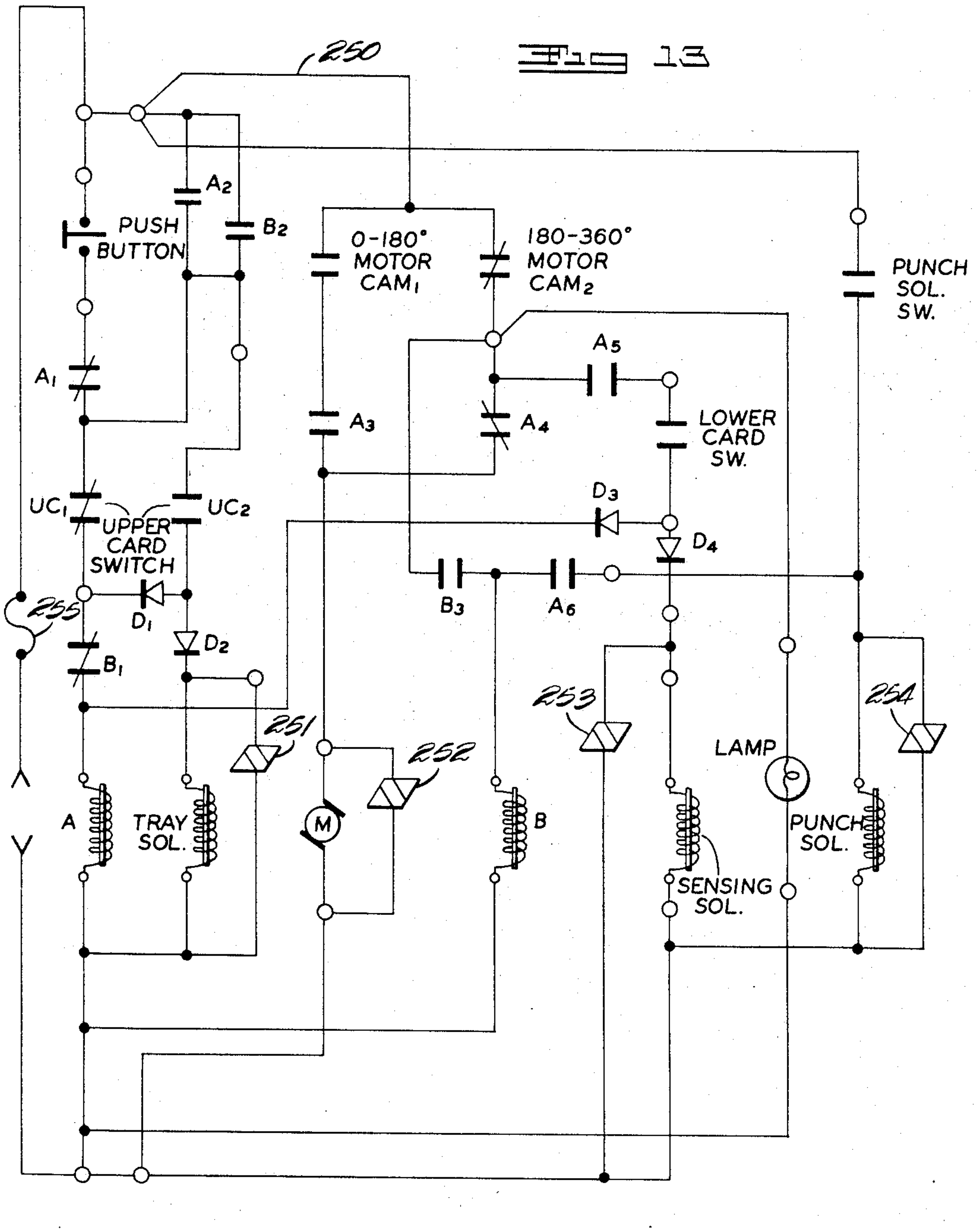

FIG. 13 is a schematic representation of the circuit involved in the present machine.

Figures 14, 15:
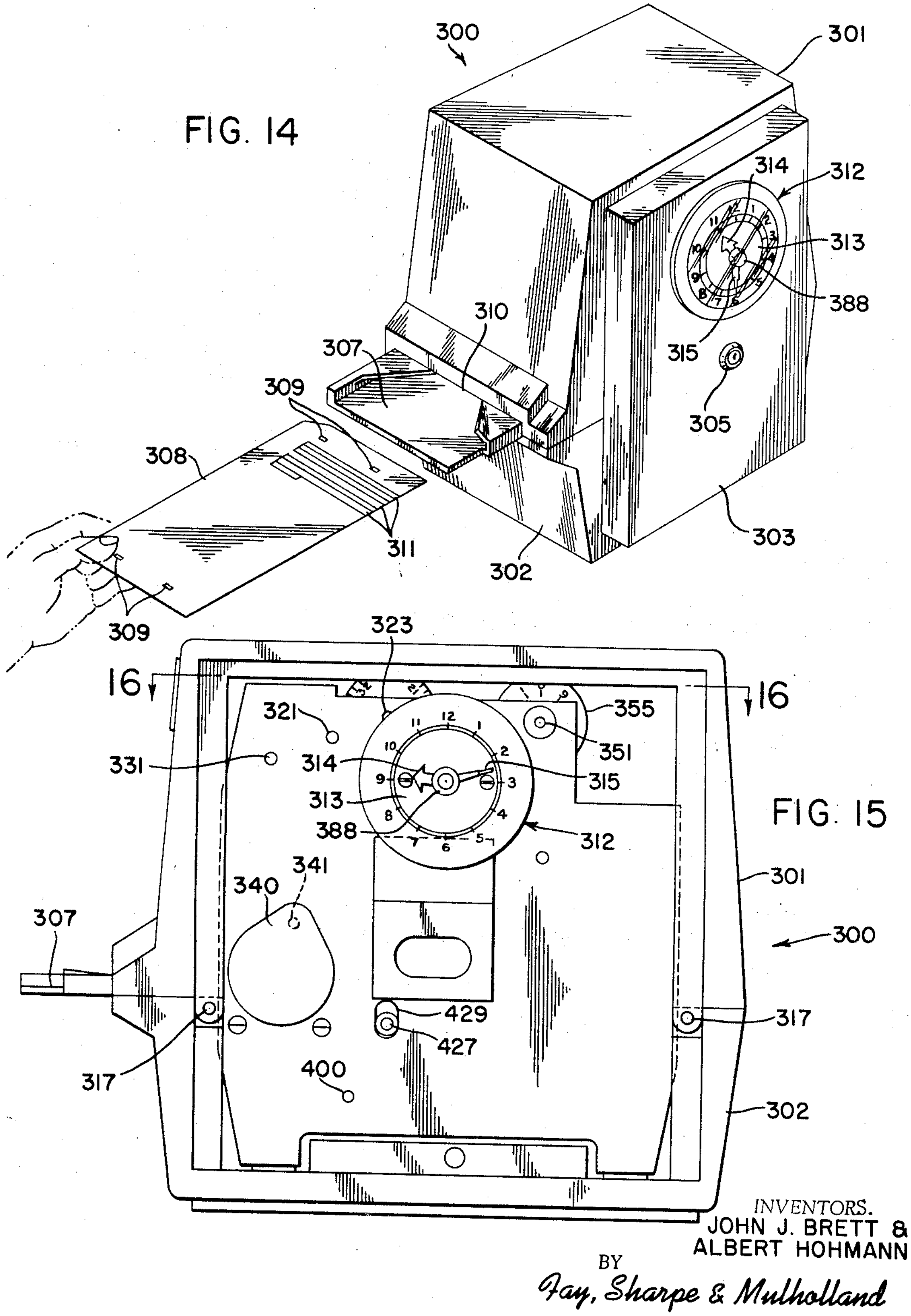

FIG. 14 is a perspective view of the time punch.

FIG. 15 is a front view of the time punch with the front panel removed.

Figure 16:
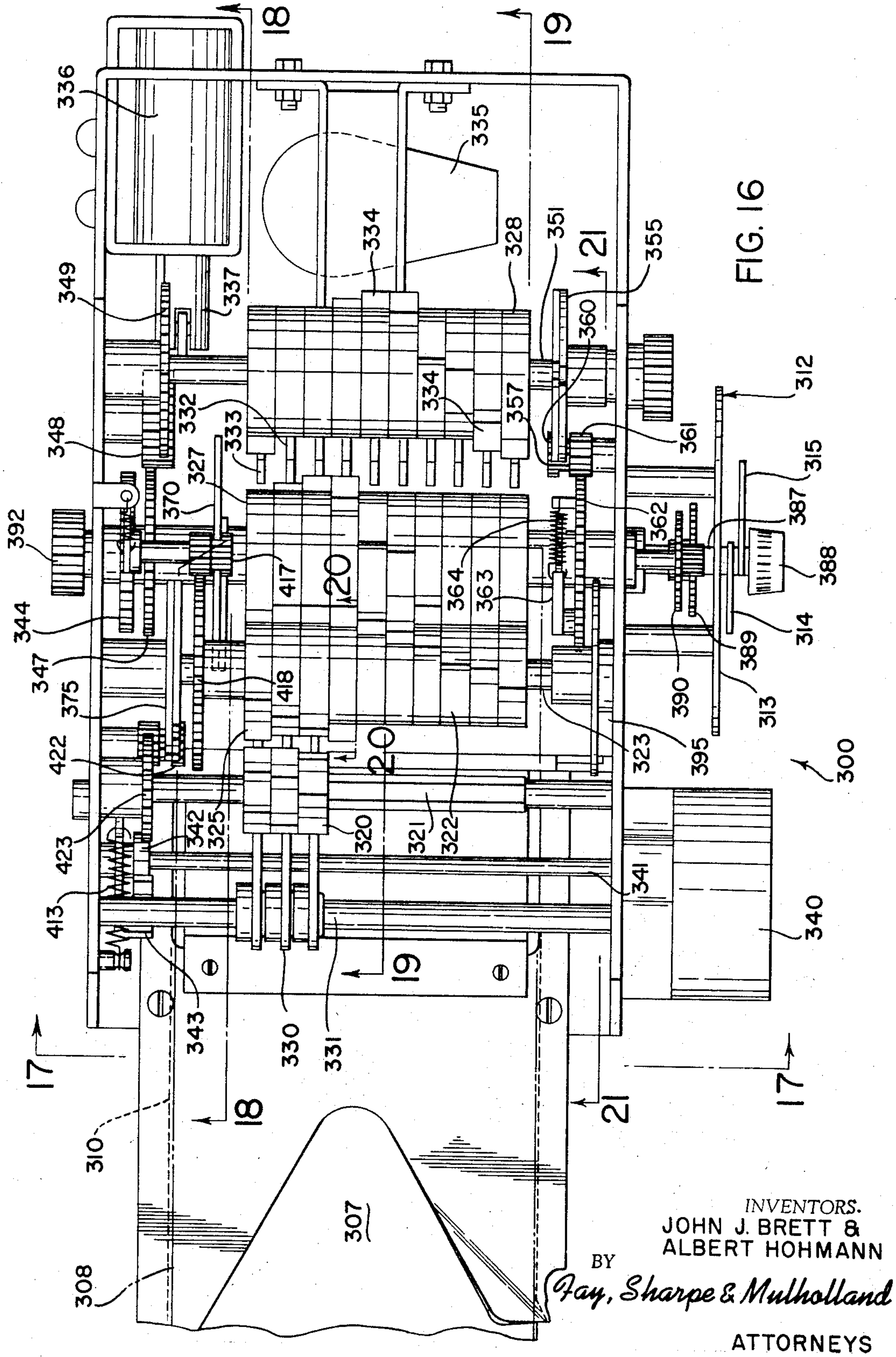

FIG. 16 is a top view of the working mechanism of the present invention with the casing removed.

Figure 17:
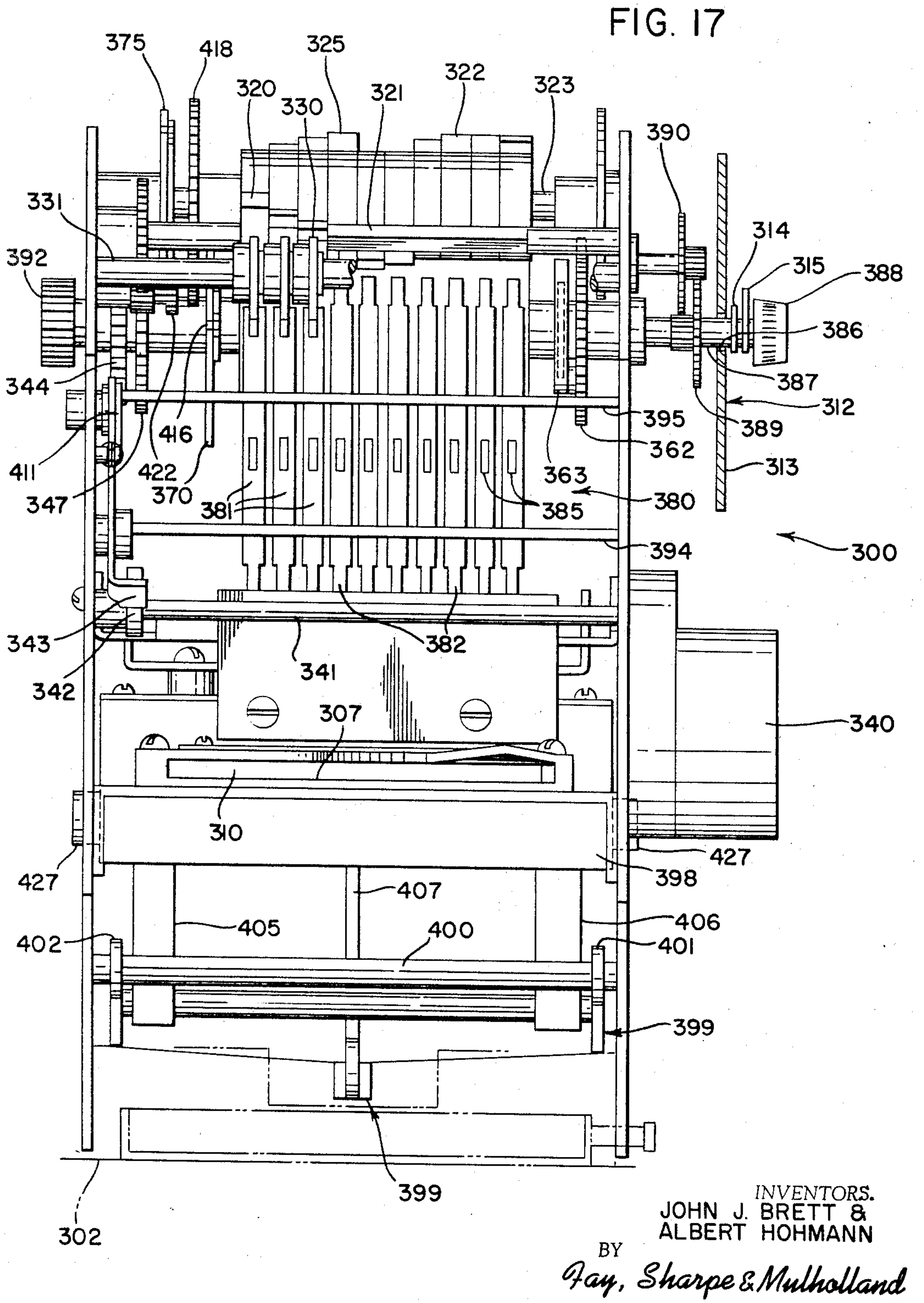

FIG. 17 is taken along the sectional 17—17 of FIG. 16.

Figure 18:
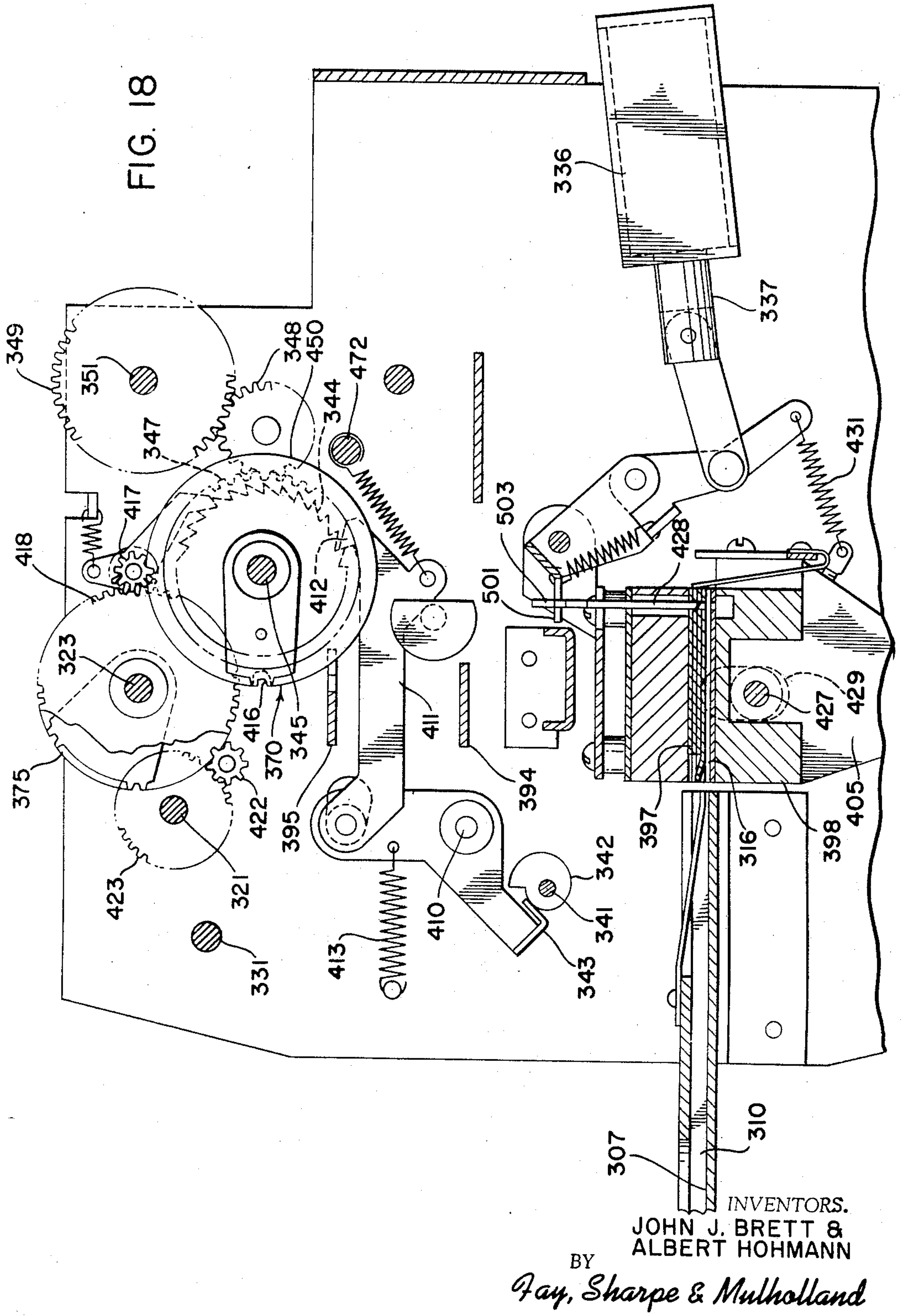

FIG. 18 is a sectional taken along 18—18 of FIG. 16.

Figures 18B, 21:
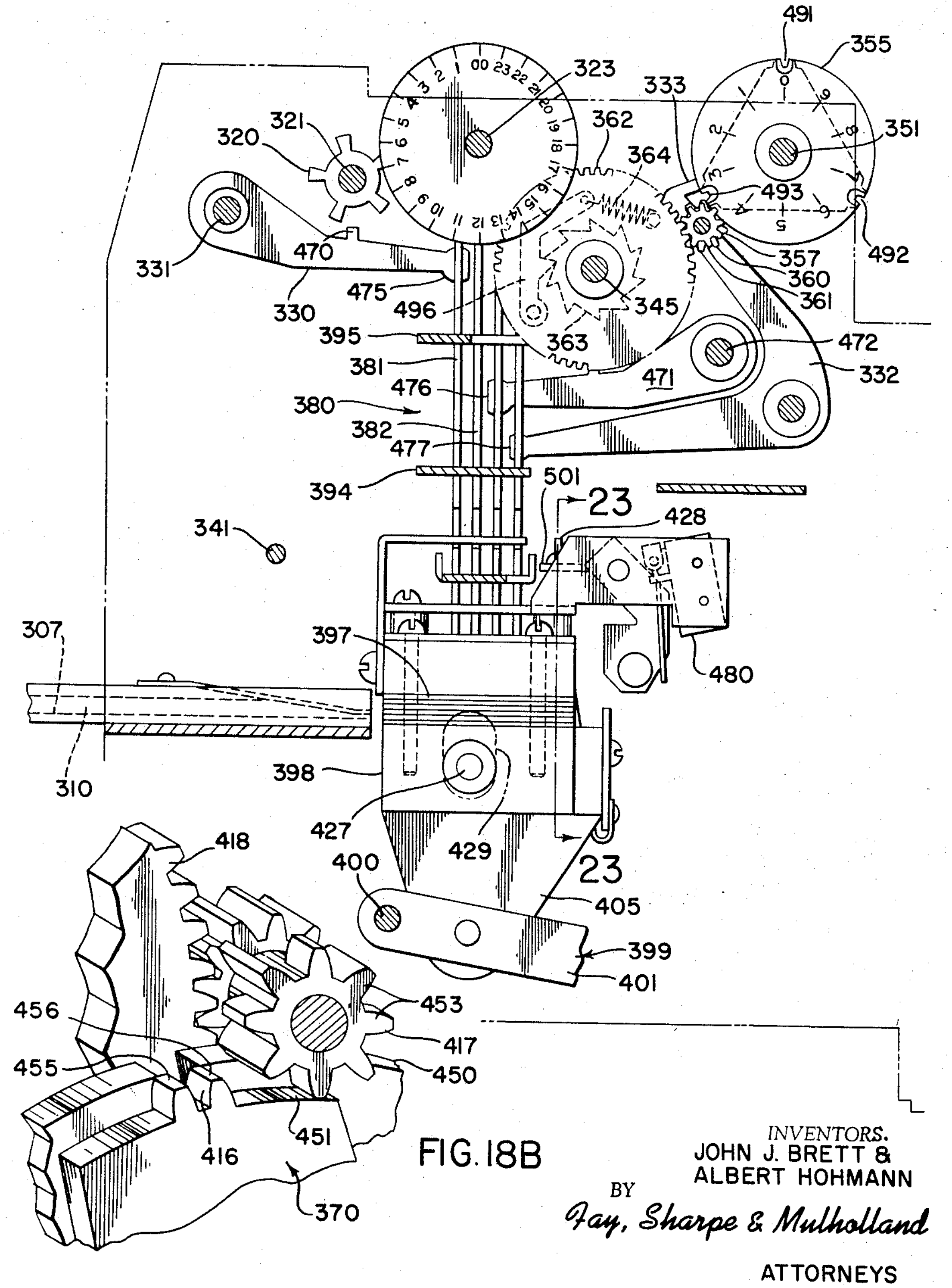

FIG. 18B shows the intermittent gearing used herein.

Figures 19, 20:
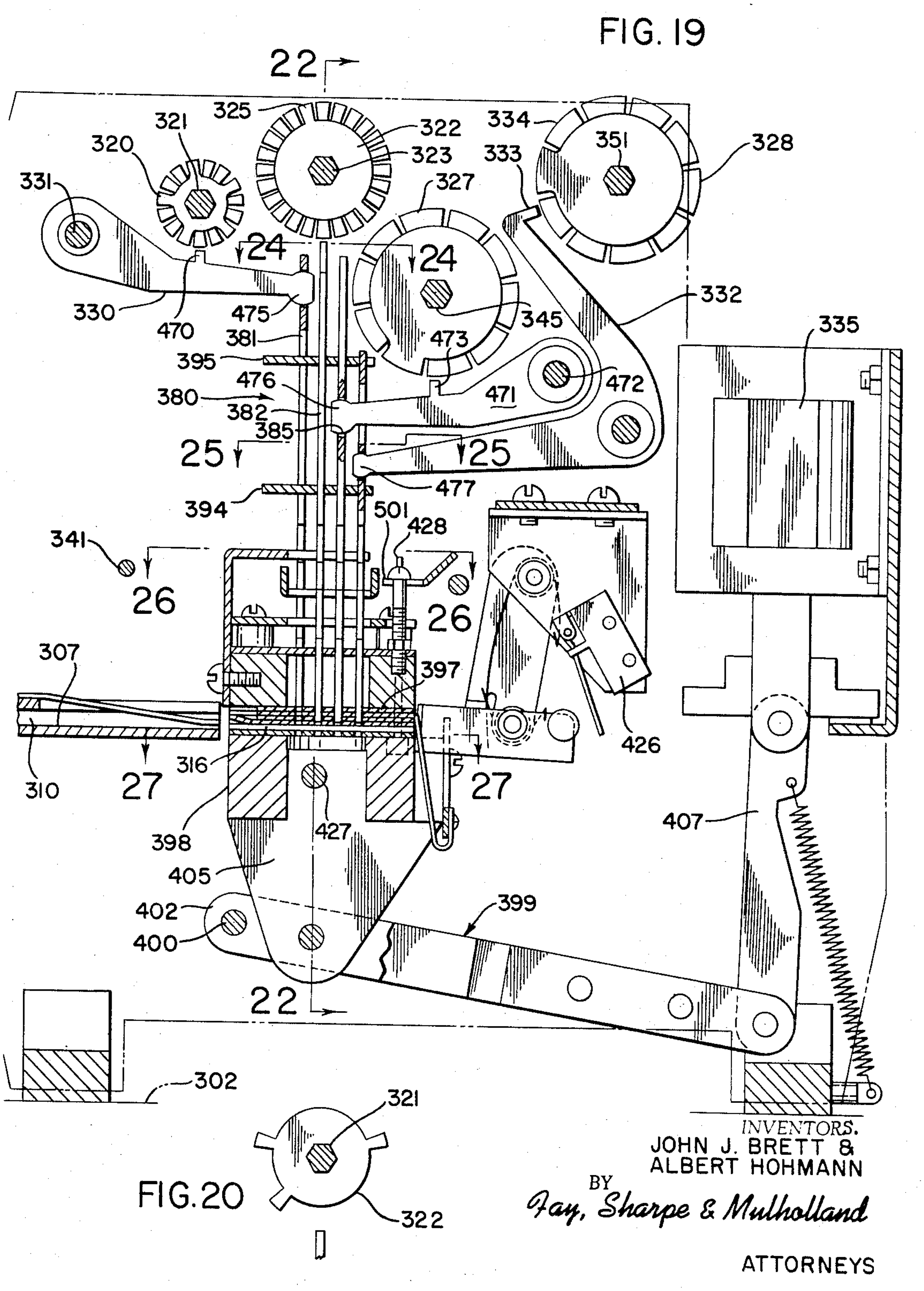

FIG. 19 is taken along sectional 19—19 of FIG. 16 and indicates the cam stops and punches and their cooperation with each other.

FIG. 20 shows a cross sectional view of the cam.

FIG. 21 is taken along section 21—21 of FIG. 16.

Figures 22, 23, 24, 25, 30:
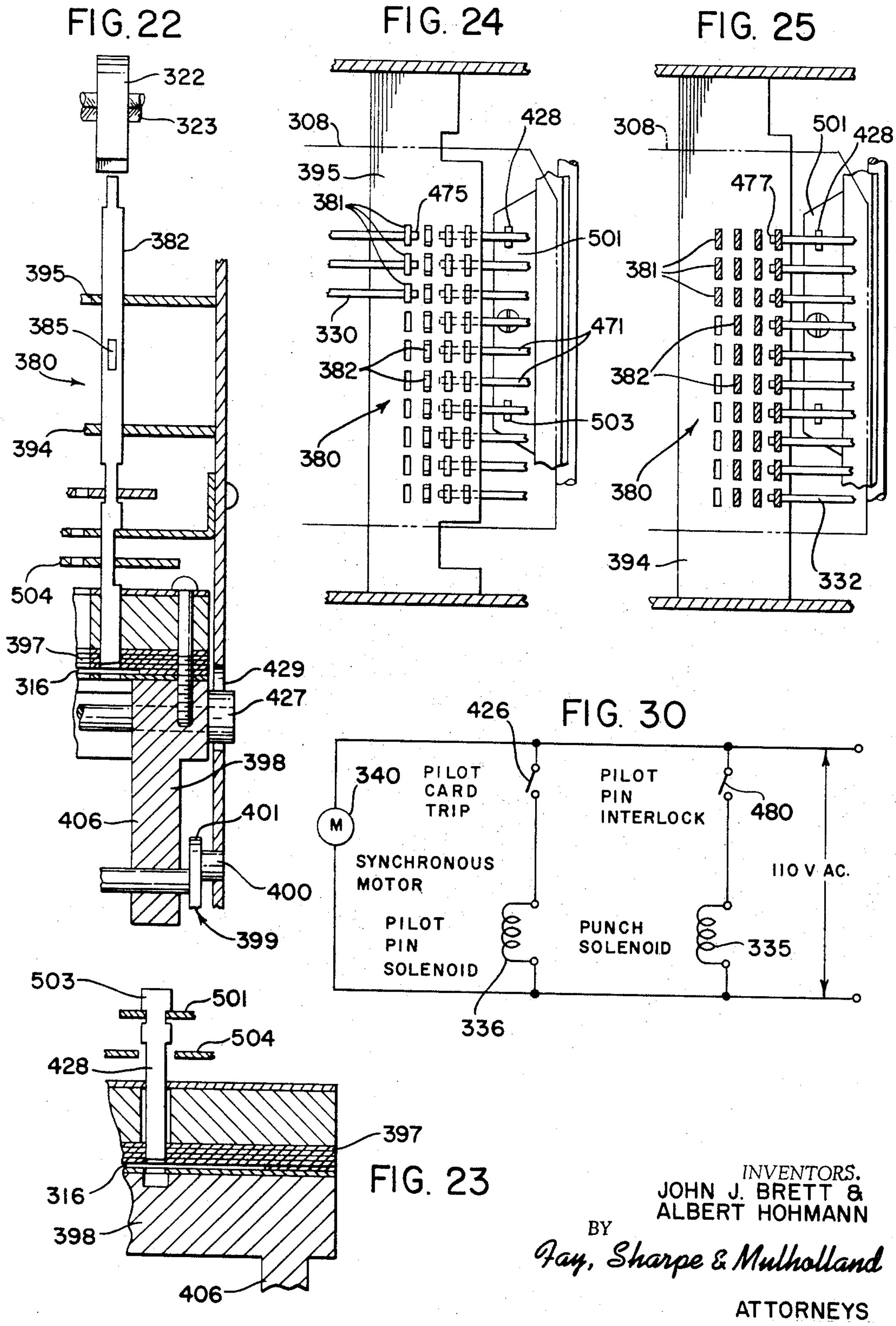

FIG. 22 is taken along lines 22—22 of FIG. 20.

FIG. 23 is taken along section 23—23 of FIG. 21.

FIG. 24 is taken along section 24—24 of FIG. 19.

FIG. 25 is taken along section 25—25 of FIG. 19.

Figure 26:
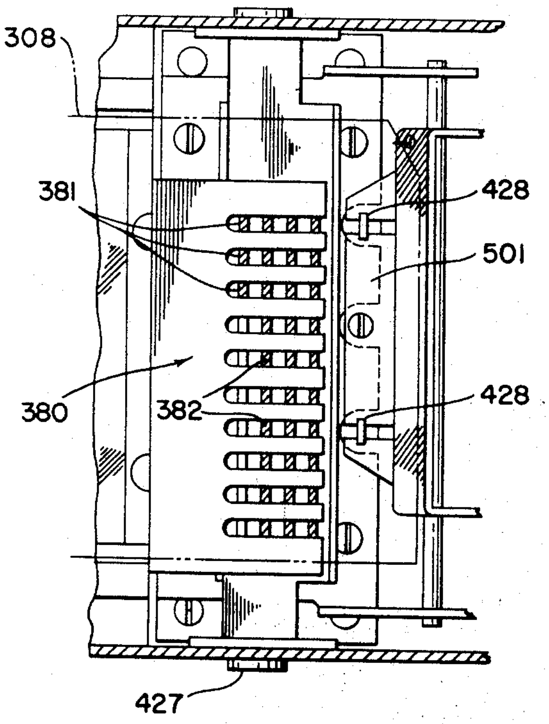

FIG. 26 is taken along section 26—26 of FIG. 19.

Figure 27:
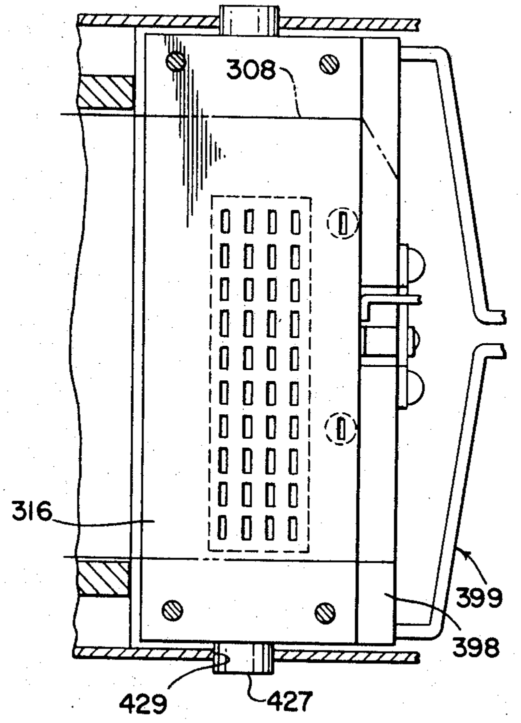

FIG. 27 is taken along section 27—27 of FIG. 19.

Figure 28:
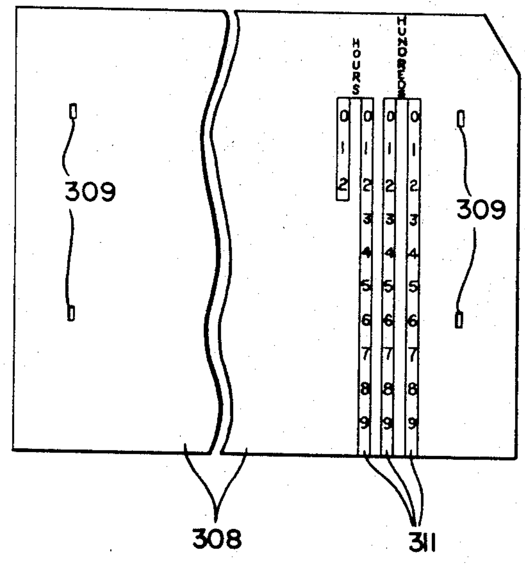
Figure 29:
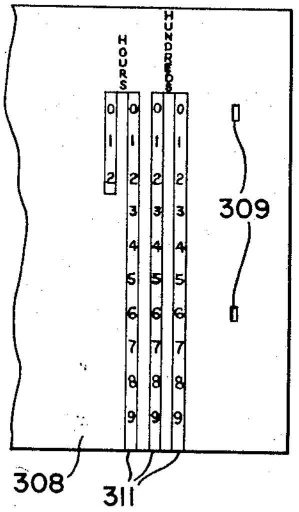

FIGS. 28 and 29 show a card used in the present invention.

FIG. 30 is a schematic diagram of the electrical components of the time punch.

Figure 1:
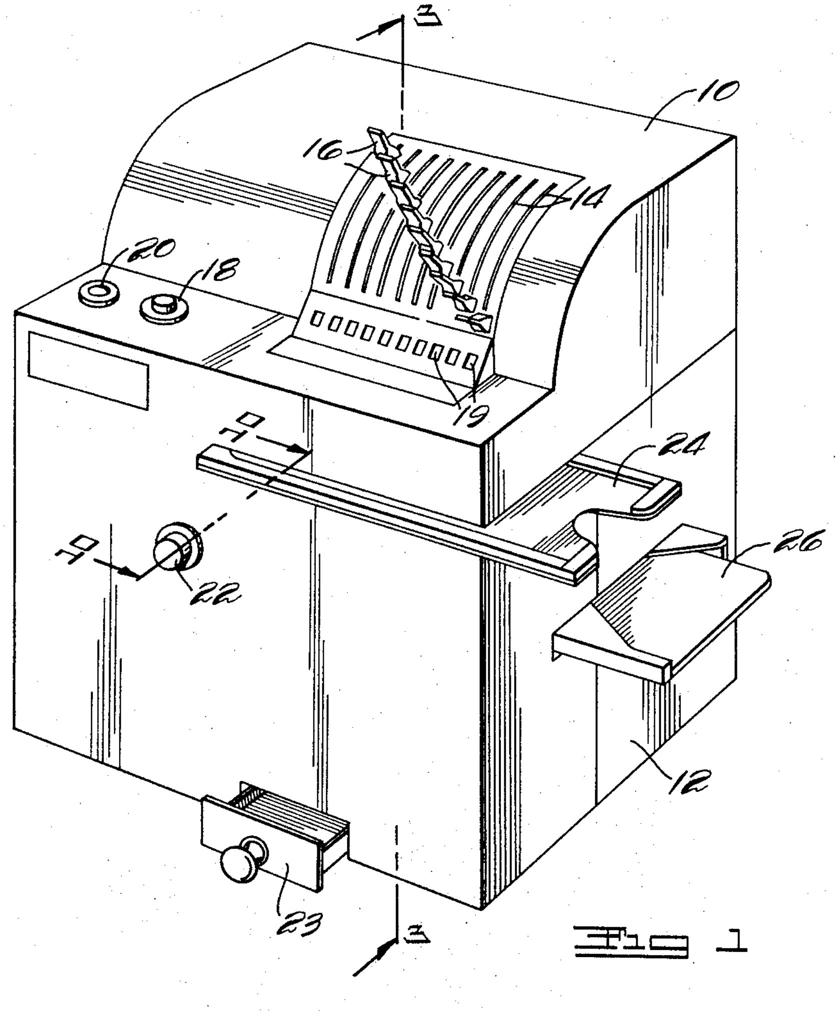
FIG. 1 is a perspective view of the present invention in its card read-variable data punch unit.

FIG. 1 indicates the first embodiment of the invention wherein the basic punch unit is used with the card read-variable data unit. The casing is made of two separable sections, illustrated as 10 and 12. Slots 14 are provided in the portion 10 of the casing. Lever handles 16 are mounted on levers (not shown) which move within slots 14. Numbers are provided along the length of the slots 14 to indicate the different positions thereon. Indicator windows 16 also show the positions of the levers.

A button switch 18 is provided near the face of the machine and is connected to elements which actuate the initial procedure of the machine as described more fully hereinafter. An indicator 20, usually a red light, indicates when the button 18 has been pushed and the machine is programmed and ready to punch a blank card.

A button 22 is provided in front of the machine which connects to the mechanism which changes the stop position of the card. This mechanism will also be shown in more detail in FIGS. 10–12 and will be discussed more fully in the description of those figures. A tray 23 is provided at the bottom portion of the cover in order to receive the punched out portions of the cards.

An upper reception platform 24 for a previously punched master card is provided toward the upper and front portions of the cover 10. A lower platform 26 for the blank card is provided to the rear and down from the platform 24 for the master card.

Figure 2:
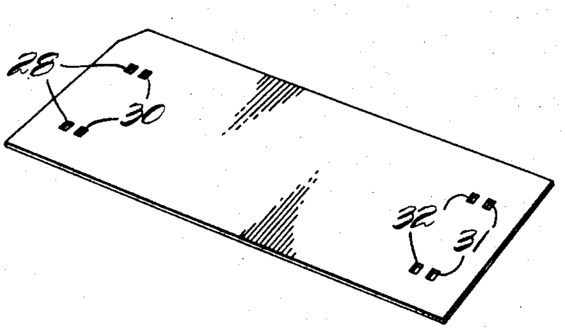
FIG. 2 is a representation of the blank card as used in the machine.

FIG. 2 indicates a computer data punch card 27 which will be used in the machine. The card has a corner missing to insure proper positioning of the card. Pilot holes 28 nearest the outer edge of the card form one set of pilot pin reception holes which will aid in actuating the machine. A second set of pilot holes 30 will also be used to actuate the machine when the card is in a second position so that it will be able to record twice as much data at the end of the card. The card also has similar sets of pilot pin holes 31 and 32 at the other end of the card 27.

Figure 3:
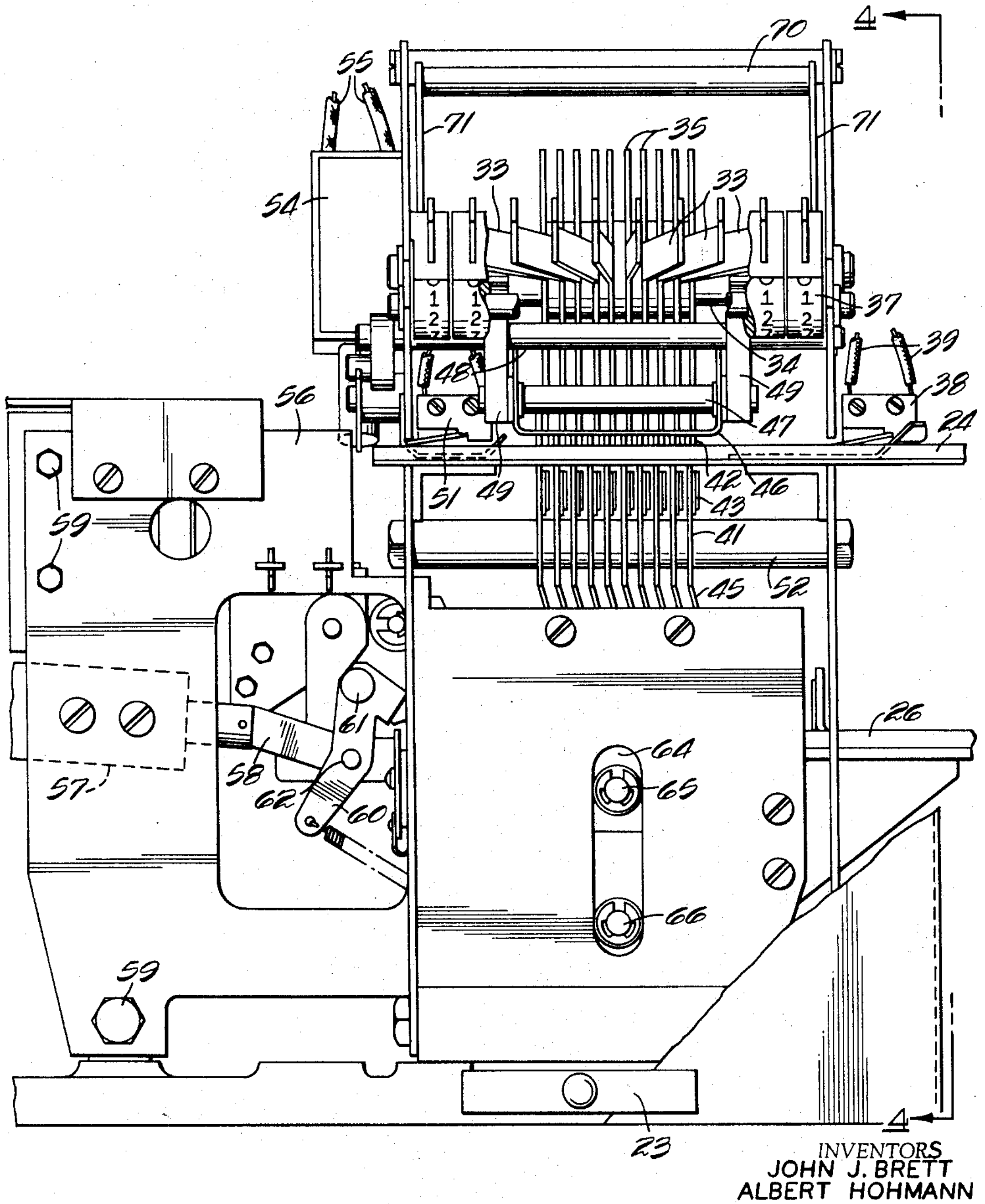
FIG. 3 is a sectional view taken along the lines 3—3 of FIG. 1 which shows a front view of the machine with the casing removed.

FIG. 3 indicates a front view of the machine with the covers 10 and 12 removed.

Levers 33 are pivotably mounted on rod 34. Integral with the programming levers 33 are disc-shaped sections 35. These discs have a toothed circumference which is not shown in FIG. 3 but which is used for locking the levers in position once the machine is programmed. Number indicators 37 are used to indicate the relative position of the levers 33 to the operator.

The upper platform 24 is positioned below the programming levers 33. A first upper card microswitch 38 is positioned near the entering point of a master data card on the platform 24. Suitable electrical connections 39 are provided with the microswitch 38. Interposers 41 are provided below the platform 24. The interposers 24 are moved to different positions by a rear portion 42 of the programming levers 33.

The bottom portion of interposer 41 has a leg 45 which moves immediately over the top of the punches (not shown in FIG. 3).

A tray 46 is mounted on rods 47 and 48 which are supported by bars 49. The tray 46 is so pivoted that it will position itself on top of the master card when the machine is actuated or programmed with a master card. The tray 46 is actuated by a second upper card microswitch 51 which is positioned near the stop on the platform for the master card. The microswitches 38 and 51 govern the action of the tray 46 by means of a solenoid 54.

A housing 56 is provided for the levers and mechanism which operate the movement of the die. A sensing solenoid 57 is connected to levers 58 and 60. A spring 61 biases levers 58 and 60 to the right as viewed in FIG. 3. Lever 60 is pivoted by bolt or pins 11 and is connected to the lever 58 by a pin 62.

A vertical slot 64 is provided to allow vertical movements of rods 65 and 66 which support the die (not shown).

The plate 56 is held onto the frame by means of suitable bolts 59.

The bar 70, supported on its ends by levers 71, is mounted to pivot on the same bar 34 on which the levers pivot. The bar 70, as will be more fully explained hereinafter, is used to return the levers 33 to their initial position after a card has been punched.

Figure 4:
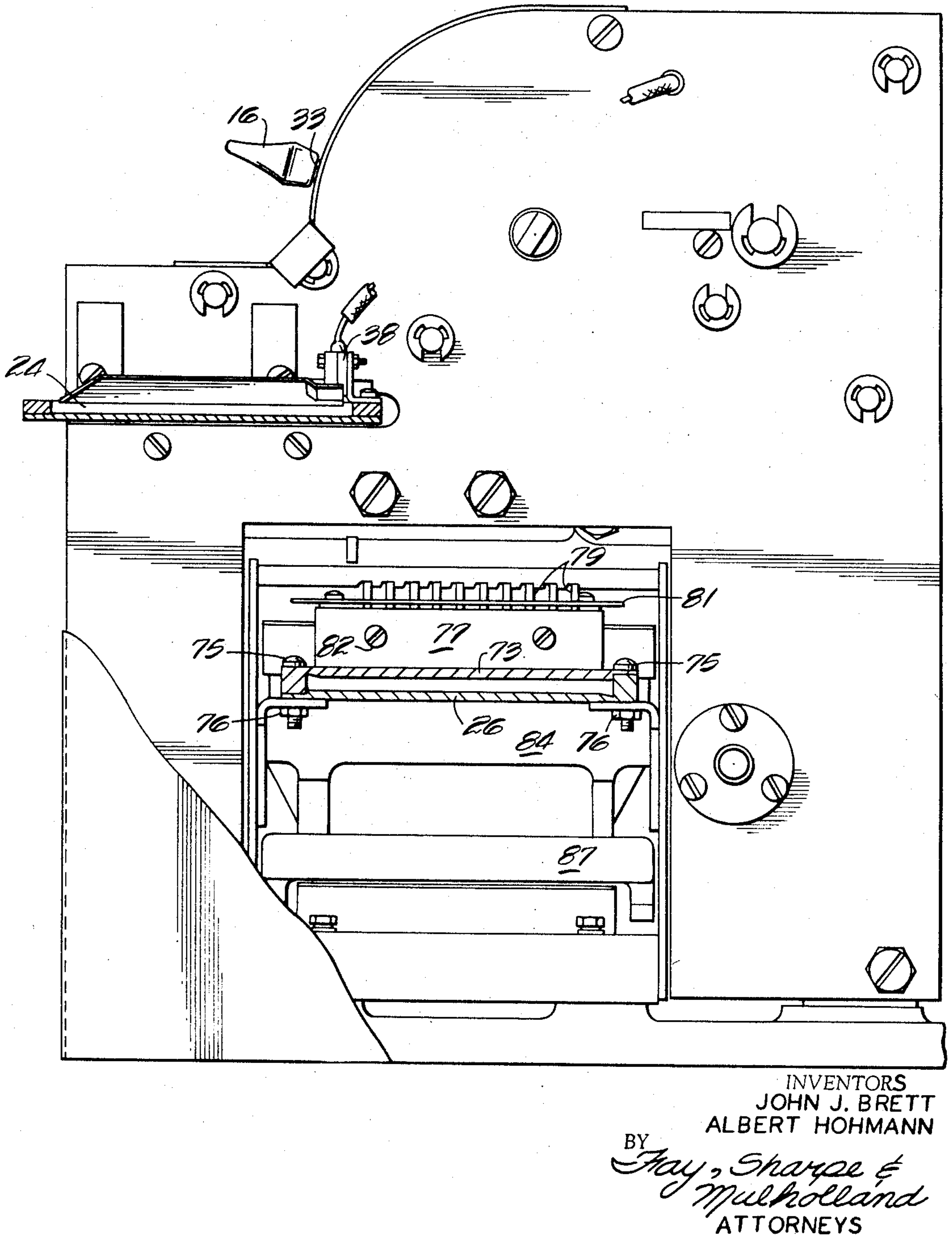
FIG. 4 is a partially cut away side view.

FIG. 4 is a partially cut away view of the right side of the machine looking into the slots which receive the data cards. The lever handles 16 connected to the levers 13 are shown at some intermediate position. The upper platform 24 for the master card is below the lever handle 16 as well as microswitch 38. Lower platform 26 for the blank card has a top portion 73 connected to the bottom portion by screws 75 and bolts 76. Above the top portion 73 is positioned the stripper 77. Positioned perpendicular to the plane of the stripper are punches 79. The punches are held in alignment by the stripper 77 and a slotted plate 81. The stripper is held in position by means of screws 82 or other suitable means.

Below the blank card tray 26 is the die 84. The die 84 has legs 85 which are pivotably mounted on a rod (not shown). Element 87 is the back portion of a yoke which is illustrated in FIG. 5.

Figure 5:
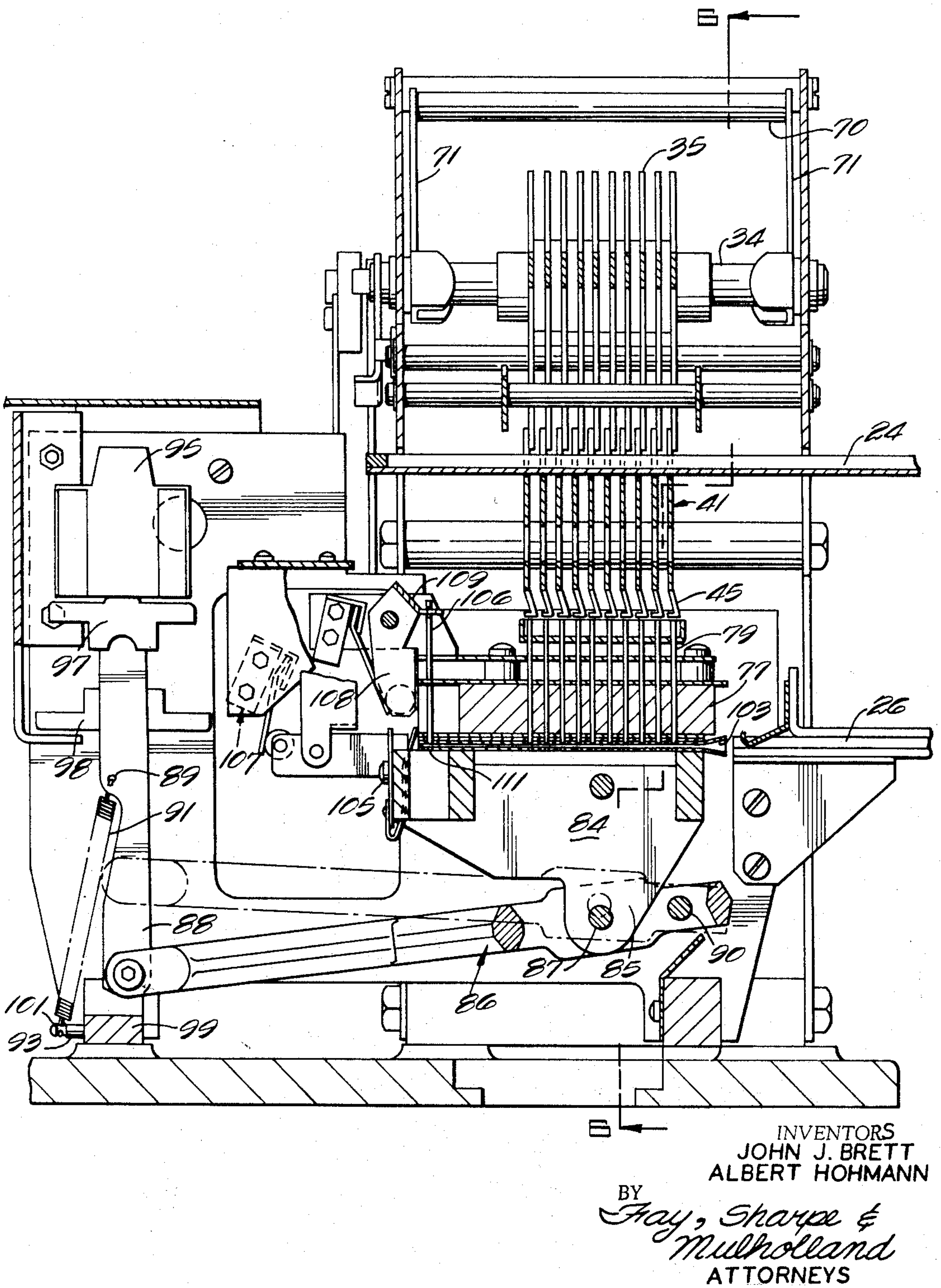
FIG. 5 is a sectional view from the rear of the machine.

FIG. 5 is a front view of the machine showing the cooperation of elements which punch a card. The die 84 is connected to a yoke 86. One end of the yoke 86 is engaged with the die by means of a bolt or pivot of some type 87 allowing the yoke 86 to rotate freely about a portion of the die 84. Rod 90 is a support and the pivot for the yoke 86.

The other end of the yoke 86 is connected to a bar 88. The bar 88 has an opening 89 in which one end of a spring 91 is connected. The other end of the spring 91 is hooked to some stationary abutment 93, having a groove therein 101 and attached to a block 99, in order to return the bar 88 once it has been moved.

A punching solenoid 95 is positioned at one end of the bar 88. The punching solenoid 95 lifts the bar 88, yoke 87 and die 84 when it is actuated.

A stop 97 is provided on the bar 88 in order to permit only limited movement in one direction. A second stop 98 may also be used to permit the limited movement in the down direction.

Blank card receiving platform 26 forms the entrance into the slot 103 formed by the die 84 and the stripper 77. As the card enters the slot 103, it trips the microswitch 105.

Once the microswitch 105 is closed, there are innumerable ways in which either mechanical or electrical means may be used to drop pilot pins 106 into the slot 103 and into the pilot holes of the blank data card which will be positioned directly below the pilot pins 106 if the card is properly inserted. As shown in FIG. 5 a grouping of switches 107 which will be more fully described in FIG. 13 is used to trip lever 108 thereby releasing a fork-type attachment 109 so that it will pivot downward hereby releasing pilot pins 105.

When pilot pins 106 are dropped through a proper data card, they make electrical contact with points 111 positioned beside the die 84. This contact completes a circuit so that punching solenoid 95 will raise the arm 88 thereby lifting yoke 86 and moving die 84 upward.

FIG. 6 indicates the cooperation between the levers to program the machine, the master card input, the interposers, and the punching mechanism. The lever handles 16 are attached to the levers 33 which are pivoted about rod 34. Each lever 33 has its own partial disc 35 having teeth 120. Teeth 120 actuate small pins 121 mounted in a casing 123. The pins 122 are biased to the left, as viewed in FIG. 6, so that as a tooth rubs against a pin, it pushes it to the right. A reciprocating action is thus caused as the teeth move by the pins.

A panel 124 is mounted to pivot about a rod 125. The panel 124 is moved to a position abutting the pins 122 by means of a shaft 127 having a substantially semi-circular section along part of its length. The bar 127 is turned, during the programming of the machine, to a position which blocks any movement of the pins. The blocked pins in turn prohibit any movement of the levers 33 by interlocking themselves with the teeth 120. After the card has been punched, the pins are released. An integral part of the toothed disc 35 is an arm 42 having a small disc 131 at its end.

The arm 42 cooperates with the interposers 41 which are mounted to slide along bars 132 and 133. The interposers 41 have an arm 43 pivoted about a rivet or a small screw 135. A small point 136 is a part of the arm 43 and is generally at right angles to the main part of the arm. A spring 138 is used to bias the lever 43 in an upward direction.

A small leg 45 generally extends below the interposer. The leg 45 has its lowest section generally parallel to the plane of the die 84. There are as many interposers as there are rows of punches 79, which is ten in this instance.

Along the top length of the interposer 41 is a vertical arm 140. The length of the arm 140 must be such that it will meet and abut against the small disc 131 on the arm 42 of the lever 33. The interposers 41 further have a small hole 141 near their rear portion in which a spring 143 is connected. The springs 143 pass around wheels 145 and 147 and are connected to a permanent plate of some type, generally designated as 148. The spring 143 maintains only a slight tension in order that the interposers 41 may move to the right when it is released.

The mechanism to hold and release the interposers 41 are L-shaped bars 149 (only one visible) which are mounted on and pivoted about a rod 151. At the other end of the bar 149 is a shaft 152 which cooperates with and abuts against the end of interposers 41. The bars 149 are usually in a position as shown in the dotted lines. Their primary functions are to hold the interposers 41 to their forward position when in a rest position, release the interposers when the machine is programmed and then return the interposers to a forward position once a card has been punched.

As previously discussed, a tray 46 is mounted above the platform 24 for the master card. The tray 46 is connected to and pivoted about a bar 153. A bar 155 supports one end of lever 157 and moves in slot 156. The other end of lever 157 is mounted on a bar 154 which is operatively connected to a tray solenoid (see FIG. 8). A rod 154 is rotated by the solenoid so as to move lever 157 against the tray 46 and press it against a master card on the platform 24.

A short description of the operation at this point may be helpful. Assuming that a pre-punched master card has been placed on the platform 24 and that the levers have been moved to some intermediate position, so that disc 131 will be in a path which coincides with the path of the arm 140 on the interposer 41. When the machine is activated, which will be explained more fully hereinafter, the L-shaped levers 149 move backward releasing the interposers.

Since the interposers are no longer held in place, the tension from springs 143 moves them to a back position. As they move backward, the arm 43 which is biased upward skims along the underside of the master card. When it arrives at a pre-punched hole in the master card, the arm moves upward and the point 136 at its end catches in the hole. At this point the interposer will halt its movement.

If there is no hole in the path of the point 136, the interposer will continue backward until it meets the disc 131 mounted on the arm 42. When this occurs, the movement of the interposer will also be halted. Thus, the master card or the levers 33 may be used to program the machine either together or separately.

After the position of the interposers 41 are fixed, the tray 46 is lowered onto the platform 24 and rod 127 rotates to secure the pins 122 and programming levers 33.

If the points 136 do not find a hole and the arm 140 is not stopped by the disc 131, then the interposer will continue backward to its rear position. However, assuming that it is stopped by either method, then the leg 45 on the bottom portion of the interposer 41 will be at a position above one of the punches 79. The punch 79 above which the leg 45 stands will exactly coincide with the hole in the master card or with that position of the lever 33. This punch then will make a hole in the blank data card when the die 84 moves upward against the punches 79. The remainder of the punches that do not have the leg 45 positioned above them will simply move upward with the die but resting on top of the blank data card and then return down with the die as it goes back to its initial position.

After the card is punched, shaft 152 pushes the interposers 41 back to their original position, and rod 70 pushes levers 33 to their starting point after the rod 127 has released the pins 122. The movement of shaft 152 as well as the other actions are controlled by an electric motor and appropriate switches and cams. This will be discussed more fully in reference to later figures.

Also shown in FIG. 6 is the yoke 86. The legs 160 and 161 of the yoke 86 are connected to and pivoted about the rod 90 which is in turn connected to the frame by appropriate means.

FIG. 7 is a partially cut away rear view of the machine. A motor 165 turns a shaft 167 having cams 168, 169 and 170 thereon. The first cam 168 moves a roller 175 which is connected to a lever 176 which is so mounted as to open and close a microswitch 177. The second cam 168 away from the motor 165 moves a roller 179 which in turn is connected to a bracket 180 attached to a rod 182. The bracket 180 is suitably connected to a lever 183 which is pivotably mounted to a generally rectangular block 185 by means of a locking pin 186. The block 185 is attached to the rod 127 which is used to move the plate 124 to lock the pins previously discussed which lock the levers 33 in position.

The third cam 170 from the motor 165 abuts against an extending rod having a roller 188 on the end thereof. The rod is attached to one point of a triangular shaped member 190. One of the other points of the triangular member 190 is connected to rod 151 which supports the rod 152 by means of arms 149. The movement of cam 170 thus controls the release and return of the interposers.

The third point of the triangular member 190 has an abutment extending therefrom 192 which is used to engage one end of arm 193 which in turn is connected to the rod 70 which returns the levers 33 to their initial position.

FIG. 8 indicates a side view and is taken along 8—8 of FIG. 7. The lever 193 is connected to generally triangular element 195 which is pivoted about rod 196.

A tray solenoid 198 has suitable connections 199 and 200. The core 202 of the solenoid 198 is connected to a lever 203 having a slot formed at one end 204. A generally oval-shaped lever 206 is pivoted about rod 207 and has an abutment 208 at the other end thereof. As the core 202 of solenoid 198 moves upward, the lever 203 pivots about a point 210 thereby causing the sides of the slot 204 to push the abutment 208 downward. This action causes the tray which was discussed earlier to move downward over the top of the pointers on the interposers.

A spring 212 is connected at one end to the frame of the machine. The other end of the spring 212 is connected to lever 193 in order to bias the lever to the right as shown in FIG. 8.

Below the spring 212 is shown the mechanism for releasing the pilot pins 106. At one end of the slot 103 is a U-shaped element 215 attached to the frame by screws 216. A resilient member 217 is clamped around the bottom portion of the U-shaped element 215 so as to return any card which is pushed beyond the end of slot 103. 218 indicates the end of a lever which is used to close a switch and will hereinafter be referred to as the lower card switch. The lower card switch is used to activate a sensing solenoid (see FIG. 3) which rotates rod 220 so that the pilot pins 106 will be able to drop a given distance which will be sufficient to pass through any pilot holes in a punch card and make electrical contact. The rotation of rod 220 will occur as a result of the action of the sensing solenoid which is connected to the levers 221 through appropriate connections 222 and 223. The element 221 is spring biased by spring 225 so that when the solenoid releases the rod and accompanying levers, the pilot pins are returned to their original position.

FIG. 9 indicates the same view and elements as FIG. 8 except that the motor has been rotated 180° with the accompanying movements of the different elements. After the motor has turned 180°, it is noted that the cam 169 has moved the lever 183 so as to lock the levers 33 in whatever position they are at the time of the punching. Cam 169 has engaged lever 193 so that after a blank card is punched, the lever 193 will act so as to return the levers 33 to their original position.

Core 202 is shown after it has been drawn up into solenoid 198. This action moves levers 203 and 206 which places the tray down over a master card which has been inserted in the machine. Simultaneously rod 220 as shown has been rotated at this point by the insertion of a card in the lower card slot 103. At this point the pilot pins 106 are dropped downward as they are released by the plate 222.

What has hereinbefore been referred to as "programming" is simply placing a master card on the platform 24 and/or positioning levers 33 and then actuating the motor 165 to move the cams and levers as described in FIGS. 7–9.

FIGS. 10, 11, and 12 indicate different views of a mechanism which can be utilized with the present invention to record twice as much data on a given blank data card. As earlier discussed, it is relatively simple to put two pairs of pilot holes at each end of the data cards to be used in the present machine. In order to utilize both pairs of pilot holes at each end of the card, it is necessary to use two distinct stopping positions for each end of the data card. In order to do this a mechanism is provided which will slide in front of the normal stops, thus stopping the card at an earlier than normal position. When this is done, a different set of pilot holes will be positioned below the pilot pins. The usual distance between the two pairs of pilot holes will be one column on the data card so that alternate columns on the data card will be used for each punching. The mechanism generally consists of a push-button 230 which is in direct engagement with lever 231. A second lever 232 is operatively attached to lever 231 by means of a pin 233 and slot 234. Lever 232 is pivoted about screw 233 and is connected at the other end thereof to a carriage 236. As shown by the arrows as button 230 is pushed, the carriage 236 with its legs 238 and 239 move in front of the normal stop position. The spring 240 is used to bias the lever 232 to a position to the left as shown in FIG. 10. This stopping mechanism may be used with either the card read variable data unit or the time punch.

FIG. 11 is taken along section 11—11 of FIG. 10. This view is primarily to indicate the stop 239 positioned in front of the normal stop, so that the card will be offset one column in the slot 103. This will then utilize the second pair of pilot holes in the card.

FIG. 12 is a sectional taken along 12—12 of FIG. 11. It shows that the element 241 has a generally perpendicular abutment 242 which is used to correctly position the abutment 241 in order that it may stop the card at the precise position as desired.

It must be realized that this type of abutment to reposition the data card is merely exemplary and other types are anticipated such as solenoids, levers which will remain in place when their position is changed, etc.

FIG. 13 is an electrical schematic diagram of the circuitry in the present machine. It is anticipated that some of the elements may be changed while the function is maintained.

The circuitry is designed so that two alternatives be used. That is, (1) where a master card is being used to punch a second blank card; (2) where the levers 33 are used to punch a blank card. It is also possible with the present circuit to use portions of information from both the master card and the levers simultaneously.

It is believed that it would be more meaningful to follow an actual process of punching through the circuitry than to simply give a listing of the different elements.

Assuming that a card has been inserted in the upper tray. Upper card switches $UC_1$ and $UC_2$ will be changed. That is, upper card switch 1 will be open and upper card switch 2 will be closed. At this point the push-button switch will be closed so that current will flow through the circuit made up by the closed switch $A_1$ now closed upper card switch 2 and closed switch $B_1$. The current simultaneously actuates the tray solenoid as well as the solenoid A which controls all the relays marked A. When the tray solenoid is actuated, the tray 46 lowers itself onto the platform 24 to hold the points 136 in their place in the master card.

As the current actuates solenoid A, it changes all the relays marked A from the position shown in FIG. 13. That is, all relays shown as normally closed are now open, and all relays shown as normally open are now closed.

Thus, the current flows through line 250 and through the motor cam relay from 0–180°. That is, when the push-button switch is initially closed, the current will actuate the motor so as to turn it the initial 180°. The current passes through relay $A_3$ which is now closed.

After the motor turns 180°, the second relay from 180° to 360° will close. At this point the current will light the lamp which is positioned at the front of the machine.

The machine is now ready to punch a blank data punch card. The punch card is placed in the appropriate slot 103 and as it reaches its innermost position, it closes the lower card switch. This allows the current to flow through now closed relay $A_5$, the lower card switch through $D_4$, and through the sensing solenoid. The sensing solenoid by appropriate levers, rods, etc. allows the pilot pins 106 to drop onto the data punch card. If the proper pilot holes are in the data card, the pilot pins pass through and make electrical contact which closes the punch solenoid switch. When the punch solenoid switch is closed, current then flows through it and actuates the punch solenoid which moves the die to the punches as earlier discussed and punches holes in the card.

When the lower card switch is closed, current also flows through $D_4$ now closed $A_6$ and through solenoid B. When B is actuated, all the relays marked with B's are changed from their normal positions are shown in FIG. 13. That is, $B_1$ is opened so that current now flows through the lower card switch, $D_3$ and through the solenoid A. $B_3$ is also closed so that the closed circuit to the lamp is maintained to keep the lamp lit.

When the motor has turned a full 360°, the motor cam 2 opens, and since the push button switch is open, solenoids A and B are deactivated and the system goes back to its rest position.

The other possibility is where an upper master card is not used so that upper card switches $C_1$ and $C_2$ remain in the normal positions as shown in FIG. 13. That is, when the push-button closes the circuit, the current flows through $C_1$ relay $B_1$ and actuates solenoid A. There is no current flow through $C_2$ since it is now open. No resulting flow through the tray solenoid is observed so that the tray remains in its normal position. The remaining function of the circuit is as previously described.

Diodes 1–4 are used to insure the proper current flow. Also, overload devices 251–254, are used to prevent any excess current through the various solenoids and motor. A fuse 255 is also provided to prevent any overloads.

FIG. 14 illustrates that embodiment of the present invention wherein rotary timed cams are used with the same punch mechanism as is used with variable-read data punch. The time punch 300 has a casing which is divided into three portions 301, 302, and 303. A suitably key lock 305 is used to hold the front plate 303 to the rest of the casing. A card platform 307 is provided at the side of the machine so that a card 308 may be inserted into the slot 310. The card 308 has pilot holes 309. As discussed earlier, there may be two sets of pilot holes at each end of the blank card as well as a second stop at the end of a slot 310. Columns 311 are provided on the card in order to record the different units of time in a known place.

FIG. 15 is a front view of the machine shown in FIG. 14. As indicated there, however, the front plate 303 has been removed. The clock 312 has a face 313 with the usual clock numbers thereon as well as an hour and minute hand 314 and 315 respectively.

The portions 301 and 302 of the casing are generally connected by a rod passing through concentric openings in the two parts. The rods are generally indicated as 317. It is anticipated, however, that any suitable means of connecting the casing may be used.

FIG. 16 is a top view of the time punch with the covering 301 removed. In this figure the different cams for the punches are illustrated. There are generally four sets of cams in the time punch. The ones corresponding to the ten, unit, tenth, and hundredth parts of an hour. The ten cams 320 are mounted on the hexagonal rod 321. Although not visible in FIG. 16, the ten cams have hexagonal openings therein. The unit cams 322 are similarly mounted on a rod 323. The unit, tenths and hundredths cams 322, 327 and 328 as well as the tens cams consist of a generally circular Teflon ring having a hexagonal opening at the center thereof and raised portions or cam stops 325 thereon.

A system of interposers are also provided to interact with the cams discussed above in order to hold selected punches in a down position when the die moves upward. The interposers have the same function as discussed earlier, i.e. transferring information from an input to the punching mechanisms. However, these interposers are usually in the form of levers designed to pivot at some point and subsequently pass near the cams in order that when the extending portion of the cam is near the interposer it will hold the stop in a down position.

The interposers 330 are provided to interact with the ten hour cams 320. The ten hour interposers 330 are pivoted about and connected to rod 331. The ten hour interposers 330 pass under the cams 320 and eventually end at a position directly above the punches (see FIG. 19).

The unit hour cams 322 are positioned directly above the punches so that additional interposers are not required and the extending portion 325 acts to stop the punches in this case.

The tenth hour cams 327 also cooperate with interposers to secure the punches in a down position.

L-shaped interposers 332 are used to cooperate with the hundredth hour cams 328 in order to record that part of an hour. The L-shaped stops have a pointed portion at the end thereof and which generally extend at 90° to the main portion of the stop 332. The pointed portion is generally designated as 333 and as noted in FIG. 16 will abut against the raised portion 334 in order to hold a punch in a down position.

Solenoid 335 is positioned at the top of FIG. 16. This solenoid 335 raises a yoke which in turn moves a die and is known as the punching solenoid 335.

A second solenoid, which is known as the sensing solenoid 336, is used in cooperation with pilot pins as will be more fully described hereinafter. Both solenoids are attached and held to the machines by suitable nuts, bolts and brackets.

An appropriate segmental intermittent drive gear system is used in connection with an electric motor to turn the various cams to their different positions in order to record the correct time in tens, units, tenths and hundredths part of an hour.

An electric motor 340 is used to turn the motor shaft 341 which is connected to a snail-shaped cam 342.

The snail cam 342 is used to move a spring biased lever 343. The lever 343 has a reciprocating motion because of the shape of the snail cam 342 and a spring to return lever 343 to its original position. The lever 343 is pivotably connected to a second lever (see FIG. 18) which is used to turn the gear 344 by means of a pawl and ratchet arrangement.

The ratchet 344 is connected to a rod 345 which supports the tenth hour cams. This tenth hour rod 345 has a gear 347 attached at the same end as the ratchet 344. The gear 347 is used to drive gears 348 and 349.

The gear 349 is connected to shaft 351 which supports the hundredths hour cams 328.

At the other end of shaft 351 is a gear 355 which intermittently intermeshes with gear 357. The intermittent action is accomplished by indentations on gear 355 which are spaced at intervals of 180° along the gear. However, any type gear may be used to accomplish the ten to one ration that is desired between the turning of shafts 351 and 345.

The gear 357 has two sections 360 and 361. The portion 360 has exactly half as many teeth as that portion 361. The intermediate teeth on the gear 360 have been removed to allow the portions of the gear 355 not having indentations therein to slide along the gear 360 and engage the gears 360 only at these given intermittent times.

The gear 361 is integrally connected with gear 360 and it is used to turn the shaft 345 by means of the ten hour gear 362. The tenth hour cams 327 are located on the shaft 345.

A pawl and ratchet 363 is also mounted on the tenth hour shaft 345 and is used to prohibit any counterclockwise motion of the shaft 345. A spring 364 biases the pawl in an upward direction as viewed from FIG. 16.

The shaft 345 has the same intermittent type of gear connection 370 to the unit hour shaft 323 as previously discussed. The gearing is generally intermittent causing a ten to one turning ratio between the tenth of an hour and units of a hour cams.

The same type of gearing, generally indicated as 375 is also used between the unit hour and ten hour cams as that previously described for the interaction between the hundredth and tenth hour cams.

FIG. 17 is a section taken along 17—17 of FIG. 16. FIG. 17 generally indicates a side view of the present invention. In addition to the cams and stops previously described in FIG. 16, FIG. 17 shows the punches generally indicated as 380. More specifically, there are four rows of punches for the tens, units, tenths and hundredths parts of an hour. The tens punches 381 will indicate 0, 1 or 2 as that part of the day occurs. In direct alignment behind these punches are the unit punches 382 which will indicate the unit hours on a punched card.

Unit hour cams 322 position their raised portions above the top of the punches. In this manner the punches 382 are held in a down position when the die 398 moves upward pushing a punch card against the punches 382.

Openings 385 are provided in each of the punches. These openings are to accommodate the interposers (see FIG. 19) which also hold the punches in a down position. As discussed earlier, the interposers are required for the different cams which are not physically able to be directly over the punches 380.

It can also be seen that motor 340 turns shaft 341 to which is connected the snail-shaped cam 342 which moves lever 343 in a reciprocating motion. The result of the reciprocating motion of lever 343 causes a pawl (see FIG. 18) to move ratchet 344. As discussed earlier, ratchet 344 turns the shaft 351 on which the hundredth hour cams are located. Appropriate gearing then turns each of the other shafts with their accompanying cams in ratios of ten as compared to the original speed of rotation of the hundredths cams.

The face of the clock 313 has an opening 386 through its center through which a shaft 387 passes. The shaft 387 is used for a manual setting of the clock by means of a knob 388 attached to it. Gearing 389 and 390 is used to synchronize any manual adjustment of the clock with respect to the minute and hour hands and appropriate cams. A similar knob 392 is attached to the same shaft 345 for a manual setting of the clock, however, the knob 392 is positioned behind the time clock.

A ratchet 363 with a pawl 496 (see FIG. 21) is used to insure that the clock is manually turned in only a forward direction and prohibits any counterclockwise turning of the hands. This aspect of the invention insures that there will be no turning back of the clock in order to meet certain time deadlines.

The punches 380 are held in alignment by means of guides 394 and 395. The bottom of the punches rests inside a stripper 397, which also aids in aligning the punches 380. A slot 310 is positioned between the stripper 397 and the die 398.

The die 398 is moved by means of a yoke 399 which is pivoted about rod 400. The rod 400 is held in its position by means of the yoke legs 401 and 402 and the rod's connection into the sides of the machine. The yoke 399 contacts the legs 405 and 406 of the die 398. The yoke 399 has one of its ends connected to a shaft 407 which actuates the yoke by means of the punching solenoid (see FIG. 19).

FIG. 18 is taken along lines 18—18 of FIG. 16. It indicates a cut away view of some of the gears and actuating mechanism for the time punch.

As previously discussed the snail-shaped cam 342 pivots the lever 343 about a rod 341 as the cam 342 rotates. The lever 343 is pivotably connected to a second lever 411 having a pawl 412 at the end thereof. The lever 411 is designed so that it may reciprocate with the first lever 343. The first lever 343 is spring biased by means of spring 413 to a rear position. Thus, as the cam 342 turns, lever 343 pivots moving lever 411 forward so that pawl 412 may grasp the next tooth on the ratchet 344. As the cam 342 continues to move, the lever 343 abruptly drops to its original position as the sharp decline on the cam 342 is encountered.

The ratchet 344 turns gears 348 and 349. Gear 349 turns the hundredths of an hour cams. By means of gears to the front of the machine which are not shown in FIG. 18, the tenth of an hour shaft 345 is rotated. As this shaft rotates, the shaft 345 turns a segmental gear 370 having one indentation 416 therein. This indentation turns the gear 417 once every hour. These segmental gears turn a third gear 418 which is connected to a shaft 323 on which the unit parts of an hour cams are located.

Gear 418 along with segmental gear 375 in turn rotates gear 422 which turns the tens of an hour gear 423 to which shaft 321 is connected.

The punching mechanism of the time punch is actuated by insertion of a card into slot 307 which in turn closes a microswitch 426. When switch 426 is closed, sensing solenoid 336 is actuated so that the core 337 moves inward thus extending pilot pins 428 so that they may extend down onto the blank card. If the proper pilot holes have been pre-punched in the punch card, the pilot pins 428 drop through the card and below it thus making electrical contact. The spring 431 returns the solenoid core 337 to its initial position.

After a card has been punched and the circuit is again open, the solenoid 336 is deactivated and the core 337 is returned to its initial position by means of springs 431 and 432.

FIG. 18B is an expanded perspective view of the type of intermittent gears used. Sectional gear 415 has a raised portion 450, a lower portion 451 and grooves or indentations 416 which cooperate with the teeth 453 on gear 417. The gear 415 literally slides along gear 417 until teeth 455 and 456 engage. At this point gears 417, 455 and 418 will move in sequence.

FIG. 19 is taken along section 19—19 of FIG. 16. It indicates the cams, stops, and punches and their cooperation with each other. It further shows the action in cooperation of solenoid with the punching mechanism.

As previously discussed, there are generally four sets of rotating cams 320, 322, 327 and 328. Those cams which are not directly over the punches 380 must in some way translate their motion to these punches. The manner of doing this is by means of interposers which are generally in the form of some type of levers. The ten hour interposer 330 is pivoted about a shaft 331 and has an arm extending from its upward portion 470 which will abut against the raised portion of the cam 320. There are generally three of the stops 330 so that the tens of an hour may either have one of three positions which will be zero, one and two for the twenty four hours in a day.

The unit cams 322 are positioned directly above the punches so that no additional stops are needed.

The tenth hour cams 327 do require an additional stop 471 which is pivoted about a shaft 472 and has an arm extending upward there from 473. While there may be any number of these arms and cams, a row generally consists of ten such stops to correspond to the ten punches for the tenths of an hour. That is, as the cams 327 rotate, they will, at different times of the hour, hold down a different interposer corresponding to that tenth of the given hour.

The same may be said about the hundredths part of an hour. The hundredths part of an hour cams 328 generally cooperate with the L-shaped lever 332 to cause the punches corresponding to the hundredths part of an hour to remain in a down position.

The respective interposers have heads 475, 476 and 477 which pass through openings in the various punches. This enables the interposers to engage the punches and hold them down whenever the cam is at the correct position for this operation.

In addition to the action of the dies and stripper and punches as previously described, there is afurther electrical switch 480 which can only be closed when the pilot 428 make electrical contact. This switch is used to actuate the punching solenoid 335 which raises one end of the yoke 399 thus moving the die 398 in an upward position to punch any card positioned in the slot 307.

FIG. 20 indicates the common shape of the cams. It generally has a hexagonal opening at its center, has an outer circular circumference with outwardly extending portions therefrom.

FIG. 21 is taken along section 21—21 of FIG. 16. It generally indicates the front gear mechanism which is used to connect the hundredths of an hour cams with the tenths of an hour cams. As seen in FIG. 21 and as previously explained with respect to FIG. 16, the connection is by means of intermittent gearing. More particularly, the gear 355 has intermittent indentations 491, 492 and 493. These indentations or grooves interact with the gears 357 and 361 which in turn rotate the gear 362. A ratchet behind the gear 362 identified by the number 363 and pawl 496 is used to insure that the tenths of an hour cams are never turned in a counterclockwise direction.

The circular disc to the left of the gear 362 is merely a wheel which is used to indicate the twenty four hours in the day.

The remainder of FIG. 21 has already been explained above and does not require any further discussion.

FIG. 22 is taken along lines 22—22 of FIG. 20. This figure is merely to illustrate in detailed clarity the relationship of the cam 332 to the punch 382 which is positioned above the slot 316 in which a card would be inserted. The die 398 is below the card and raises up to the punch which, if it were not for the cam 322 positioned above it, would, also move upward. Because of the cam 322, the punch 382 remains in its down position, and as the card moves to the punch a hole is punched in it.

FIG. 23 is taken along section 23—23 of FIG. 21. It is a detailed view of a pilot pin 428. As seen from this figure, the pilot pin 428 is supported on a small ridge 501 which engages a head 503 of the pilot pin 428. The machine is so designed that the abutment 501 will pivot downward releasing the head 503 so that the pin in 428 may move downward to make electrical contact. This assumes there are proper pilot holes in a blank card in the slot 316. A second platform or stop 504 is used to guide the punches 380.

FIG. 24 is taken along section 24—24 of FIG. 19. It shows the punches 380 from a top view. As indicated earlier, there are generally four rows of punches. Three of the rows consist of ten punches while the fourth row consists of only three. The top portion of the punches 380 are held in alignment by the plate 395. This is the same punch and die mechanism as previously discussed with respect to the variable read data punch. However, more punches are used with the latter device.

FIG. 25 is taken along section 25—25 of FIG. 19, and is a lower view of the punches as seen from the top. It can be seen in both FIGS. 24 and 25 that the punches are engaged by the stops 471 in the case of FIG. 24, and 332 in the case of FIG. 25.

FIG. 26 is a sectional along 26—26 of FIG. 19 and shows the top of the pilot pins 428 as suspended by a ridge 501 on the plate.

FIG. 27 shows the top of the die 398 which is mounted on the yoke 399 and is taken along section 27—27 of FIG. 19.

FIG. 30 indicates a schematic diagram of the electrical section of the machine. There is a synchronous motor 505 used to turn the various gears. When the pilot card trip switch 426 is closed by the insertion of a card into the slot, a pilot pin solenoid is actuated by a power source. The pilot pin solenoid causes the pilot pins as previously discussed to drop onto the card and through pilot holes if they are present. If the pilot pins do make electrical contact, switch 480 is closed by either mechanical or electrical means thus actuating the punch solenoid and punching the card.

The foregoing description was more by way of example and it is anticipated that other means may be used to accomplish the same results. It is intended that the scope of the present invention be determined by the following claims.

We claim:

1. A data punch and die module for use in a plurality of data input modules comprising:
- a die block;
- a stripper parallel to and spaced apart from said die block so that a punch card may be inserted in a slot formed therebetween;
- a stop at the end of said slot;
- punches mounted in said stripper so that they may slide in a direction perpendicular to the plane of said die block when a force is exerted on said punches;
- means for impulsively moving said die block with said card to said punches while some of said punches are prohibited from substantial movement, thereby punching said card, said punches being selectively prohibited from movement by an interposer on a data input module according to information supplied to it; and
- means for actuating said means for impulsively moving said die block to said punches when said card is correctly positioned.

2. The punch and die module of claim 1 wherein said means for actuating comprises a pair of pilot pins which are operatively connected with a switch at said stop and which drop into pre-punched openings in said card when said card abuts against said stop at the end of said slot, said pilot pins making electrical contact after dropping through said pre-punched card thereby actuating said means for impulsively moving said die block to said punches.

3. The punch and die module of claim 1 wherein said data input module comprises a rotary timed drive means with cams operatively attached thereto to govern the movement of the interposers which are pivotably mounted.

4. The punch and die module of claim 1 wherein said data input module comprises a means for manually transmitting information to the interposer and means on the interposer for sensing information on a master card.

5. The punch and die module of claim 4 wherein said means for impulsively moving said die block to said punches comprises a punching solenoid.

6. The punch and die module of claim 5 which further comprises a moveable abutment which may be positioned in front of said stop at the end of said slot in order that said card may be stopped at a position before its normal stopping position whereby a second pair of pilot holes in said card may receive said pilot pins and thereby position said card to record a second set of data.

7. The punch and die module of claim 6 wherein said die rests on a yoke, one end of said yoke being connected to said punching solenoid, and the other end of said yoke being pivoted so that it may move said die upward when actuated and subsequently permits said die to return to its rest position.

8. The punch and die module of claim 7 wherein said actuating means further comprises a microswitch positioned at one end of said slot which is closed when a card is inserted in said slot, said microswitch completing a circuit which drops said pilot pins into said pre-punched openings in said card thereby completing a second circuit which actuates said punching solenoid which moves said die to said punches.

9. A data recorder comprising:
- a die block;
- a stripper parallel to and spaced apart from said die block so that a punch card may be inserted in a first card receiving means formed therebetween;
- a stop at the end of said slot;
- punches mounted in said stripper so that they may slide in a direction perpendicular to the plane of said die block when a force is exerted on said punches;
- means for impulsively moving said die block to said punches;
- means for manually inserting information into the data recorder;
- means for holding a master card having stored information thereon;
- means for maintaining some of said punches in a relatively rigid position as said die block approaches thereby punching the card, said means for maintaining generally comprising an interposer having means thereon for detecting information in the master card, means for detecting the manually inserted information and means for transmitting said information to said punches; and
- actuating means for said first means for impulsively moving said die block to said punches.

10. The data recorder of claim 9 wherein said means for transmitting information to said punches comprises a leg which extends from the lower length of said interposers.

11. The data recorder of claim 9 wherein said interposers are spring biased to its normal unprogrammed position.

12. The data recorder of claim 9 wherein said interposers have an arm substantially perpendicular to its top portion, said arm coacting with said means for manually inserting information which comprises programming levers on said data recorder to position said interposers.

13. The data recorder of claim 12 wherein a second card receiving means is provided, said card receiving means having slots therein to receive a point on said arm on said interposers, a tray having slots perpendicular to said slots in said card receiving means, said second set of slots in said tray having a function of holding said point on said arm in place once it has been positioned.

14. The data punch of claim 13 wherein said tray is operated by means of a solenoid which is actuated by the insertion of a master card into the appropriate slot.

15. The data punch of claim 14 wherein a motor actuated cam moves a bar in order to return said levers to their initial positions after a card has been punched.

16. The data punch of claim 15 wherein means for returning said interposers to their initial position are provided, said means comprising a shaft behind said interposers which is operatively connected to a second motor actuated cam.

17. The data punch of claim 16 wherein means are provided for locking in position said levers after said machine has been programmed.

18. The data punch of claim 17 wherein said means for locking comprises pins which interact with teeth on said programming levers and a cam operated means for securing said pins.

19. A data recorder comprising:

a die block;

a stripper parallel to and spaced apart from said die block so that a punch card may be inserted in a slot formed therebetween;

a stop at the end of said slot;

punches mounted in said stripper so that they may slide in a direction perpendicular to the plane of said die block when a force is exerted on said punches;

means for impulsively moving said die block to said punches;

a rotary timed drive means with appropriate cams operatively connected thereto, said cams vertically unaligned with said punches;

pivotably mounted interposers operatively connecting said punches and said cams whereby said cams may hold some of said punches in a down position when said cams are interacted with said interposers so that when said die moves upward a card between said die block and said punches will be punched;

actuating means for said means for impulsively moving said die block to said punches.

20. The data recording unit of claim 19 wherein said actuating means further comprises a microswitch positioned at one end of said slot which is closed when a card is inserted in said slot, said microswitch completing a circuit which drops a pair of pilot pins into pre-punched openings in said card thereby completing a second circuit which actuates said punching solenoid which moves said die to said punches.

21. The data recording unit of claim 20 wherein said timed rotary drive actuates said cams with raised portions thereon, said cams being mounted on rotating shafts which are driven by said timed rotary drive through appropriate gearing.

22. The data recording unit of claim 21 wherein said gearing comprises intermittent gears causing ten to one ratio for four shafts having said cams thereon.

23. The data recording unit of claim 22 wherein said drive shaft has a hexagonal cross-section and said cams have hexagonal openings so that no slipping is encountered between said drive shafts and said cams.

24. The process of recording information on a data card in machine language comprising:

(a) placing a master card in a data recorder machine, said card having information thereon;

(b) programming the machine to read said information;

(c) punching a second card with the information read from said master card in machine language;

(d) removing said second card from said machine;

(e) placing said second card in a time punch;

(f) detecting pilot holes in said second card; and (g) punching the time in said second card if said pilot holes are detected.

25. The process of claim 24 wherein said master card is read by means of spring biased arms mounted on interposers which are free to move over punches, and secure said punches in order to punch said second card.

26. The process of claim 25 wherein said second card is punched by means of a die moving upward against said punches with certain of said punches secured in a down position because of said interposers above them.

27. The process of claim 26 wherein the time is punched in said cards by closing a microswitch due to the insertion of a card in a slot, sensing the card to see if it has certain predetermined identification holes therein and actuating a punch solenoid which will raise a die to punches provided therein.

28. The process of claim 27 wherein said time is punched by the positioning of cams which are rotated by a rotary timing mechianism over said punches and thus prohibiting them from moving as said die moves upward.

References Cited

UNITED STATES PATENTS

| | | | |
|---|---|---|---|
| 1,086,397 | 2/1914 | Powers | 234—112 |
| 2,922,687 | 1/1960 | Cooper | 346—82 X |
| 2,980,319 | 4/1961 | Clemens | 234—112 X |
| 3,135,461 | 6/1964 | Biegel | 234—45 |

WILLIAM S. LAWSON, *Primary Examiner.*